(12) United States Patent
Ikenoue

(10) Patent No.: US 9,415,313 B2
(45) Date of Patent: Aug. 16, 2016

(54) INFORMATION PROCESSING DEVICE AND INFORMATION PROCESSING METHOD

(71) Applicant: Sony Computer Entertainment Inc., Tokyo (JP)

(72) Inventor: Shoichi Ikenoue, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 44 days.

(21) Appl. No.: 14/510,380

(22) Filed: Oct. 9, 2014

(65) Prior Publication Data

US 2015/0125047 A1    May 7, 2015

(30) Foreign Application Priority Data

Nov. 1, 2013   (JP) ................... 2013-228136

(51) Int. Cl.
| | | |
|---|---|---|
| G06K 9/00 | (2006.01) | |
| A63F 13/73 | (2014.01) | |
| A63F 13/213 | (2014.01) | |

(52) U.S. Cl.
CPC ............ A63F 13/73 (2014.09); A63F 13/213 (2014.09); G06K 9/00288 (2013.01)

(58) Field of Classification Search
CPC .......... G06K 9/00221; G06K 9/00308; G06K 9/00288; G06K 9/00268; G06K 9/00302; G06K 9/00335; G06K 9/00248; G06T 2207/30201
USPC ....................................................... 382/118
See application file for complete search history.

(56) References Cited

U.S. PATENT DOCUMENTS

| | | | | |
|---|---|---|---|---|
| 2003/0198368 A1* | 10/2003 | Kee | ..................... | G07C 9/00158 382/118 |
| 2005/0057653 A1* | 3/2005 | Maruya | ............ | G08B 13/19608 348/159 |
| 2007/0140555 A1* | 6/2007 | Iguchi | ..................... | G06T 11/60 382/167 |
| 2009/0196467 A1* | 8/2009 | Okubo | ............... | G06K 9/00288 382/118 |
| 2010/0141784 A1* | 6/2010 | Yoo | ..................... | H04N 5/23219 348/222.1 |
| 2010/0177206 A1* | 7/2010 | Ogawa | ............... | G06K 9/00275 348/222.1 |
| 2010/0220925 A1* | 9/2010 | Ikeda | .................. | G06K 9/00248 382/165 |
| 2011/0064281 A1* | 3/2011 | Chan | ...................... | G06Q 50/01 382/118 |
| 2011/0211110 A1* | 9/2011 | Doublet | ................. | H04N 7/188 348/370 |
| 2012/0170817 A1* | 7/2012 | Yang | .................. | G06K 9/00832 382/118 |
| 2013/0235045 A1* | 9/2013 | Corazza | ............. | G06K 9/00315 345/473 |
| 2013/0314437 A1* | 11/2013 | Fujiwara | ................. | G06T 11/00 345/629 |
| 2013/0315554 A1* | 11/2013 | Ybanez Zepeda | ........ | G06T 7/20 386/201 |
| 2014/0258863 A1* | 9/2014 | Woods | .................. | G06F 3/0484 715/716 |

FOREIGN PATENT DOCUMENTS

WO        2007/050885        5/2007

* cited by examiner

*Primary Examiner* — Stephen R Koziol
*Assistant Examiner* — Shaghayegh Azima
(74) *Attorney, Agent, or Firm* — Katten Muchin Rosenman LLP

(57) ABSTRACT

An information processing device includes an image acquirer that acquires a shot image of a user, a registered user information holder that holds face identification data of a registered user, a face recognition section that detects a face image of a registered user existing in the shot image by using face identification data held in the registered user information holder, and an information processing section that executes information processing based on a detection result by the face recognition section. The face identification data includes information on a face image of a user shot in advance and an after-processing image obtained by performing predetermined processing on the face image.

9 Claims, 16 Drawing Sheets

7

114

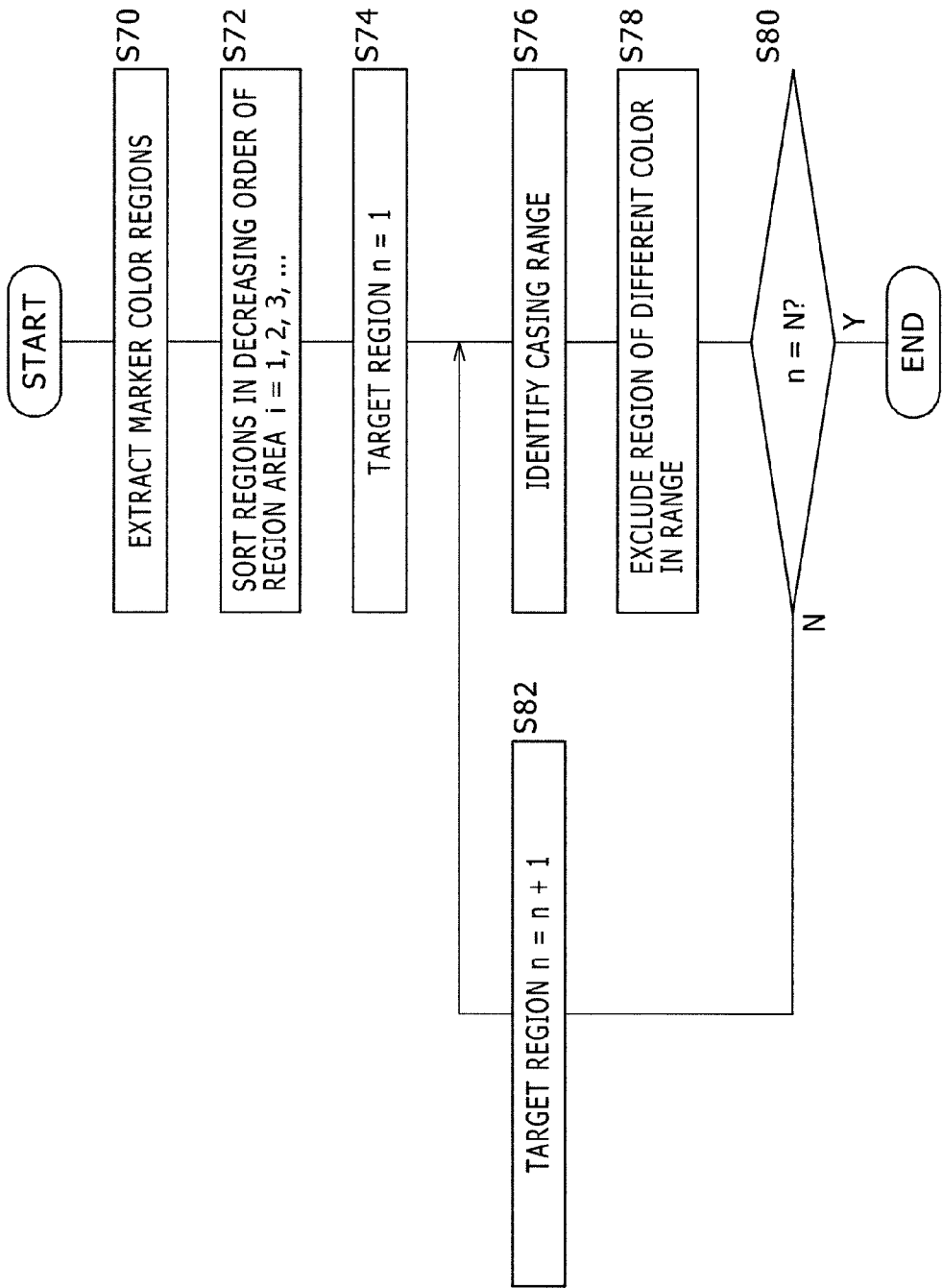

INFORMATION PROCESSING DEVICE AND INFORMATION PROCESSING METHOD

BACKGROUND

The present disclosure relates to an information processing device that executes information processing by using a shot image and an information processing method thereof.

In recent years, it is becoming general to equip a personal computer, a game machine, etc. with a camera and image the figure of a user to use the taken image in various forms. For example, systems in which an image of a user is transmitted to the other side as it is via a network, such as television telephone and video chat, and systems in which the motion of a user is recognized by image analysis and the recognized motion is used as input information of a game or information processing have been put into practical use (e.g. refer to WO 2007/050885 A2). Moreover, in recent years, it is becoming possible to realize games and image expression giving a user a more feeling of being present in the real world by detecting the motion of an object in a three-dimensional space including the depth direction with high accuracy.

SUMMARY

In the case of shooting a space where a wide variety of objects exist and executing information processing with use of the shot image as input data, the accuracy of the information processing is more susceptible to the shooting environment and so forth than in the case of operating through buttons of an input device or a graphical user interface (GUI). Therefore, it is desired to realize a device that can execute stable information processing even when the environment changes. Furthermore, it is preferable that accurate associating is made with a small burden on the user when the individual user is associated with the figure of the user in a shot image at the time of login or the like.

There is a need for the present disclosure to provide a technique that allows keeping of stable accuracy with a small burden on the user in information processing with use of a shot image.

According to an embodiment of the present disclosure, there is provided an information processing device. This information processing device includes an image acquirer configured to acquire a shot image of a user, a registered user information holder configured to hold face identification data of a registered user, a face recognition section configured to detect a face image of a registered user existing in the shot image by using face identification data held in the registered user information holder, and an information processing section configured to execute information processing based on a detection result by the face recognition section. The face identification data includes information on a face image of a user shot in advance and an after-processing image obtained by performing predetermined processing on the face image.

According to another embodiment of the present disclosure, there is provided an information processing method. This information processing method includes acquiring a shot image of a user from a connected imaging device, reading out face identification data of registered user stored in a storage device and detecting a face image of a registered user existing in the shot image by using the face identification data, and executing information processing based on a result of the detection. The face identification data includes information on a face image of a user shot in advance and an after-processing image obtained by performing predetermined processing on the face image.

What are obtained by translating arbitrary combinations of the above constituent elements and expressions of the present disclosure among method, device, system, recording medium, computer program, and so forth are also effective as embodiments of the present disclosure.

According to the embodiments of the present disclosure, information processing using a shot image can be easily realized with high accuracy.

BRIEF DESCRIPTION OF THE DRAWINGS

FIG. 18 is a flowchart showing the procedure of processing of identifying a color that can be deemed as the marker in marker detection processing in the embodiment.

DETAILED DESCRIPTION OF THE PREFERRED EMBODIMENT

Figure 1:
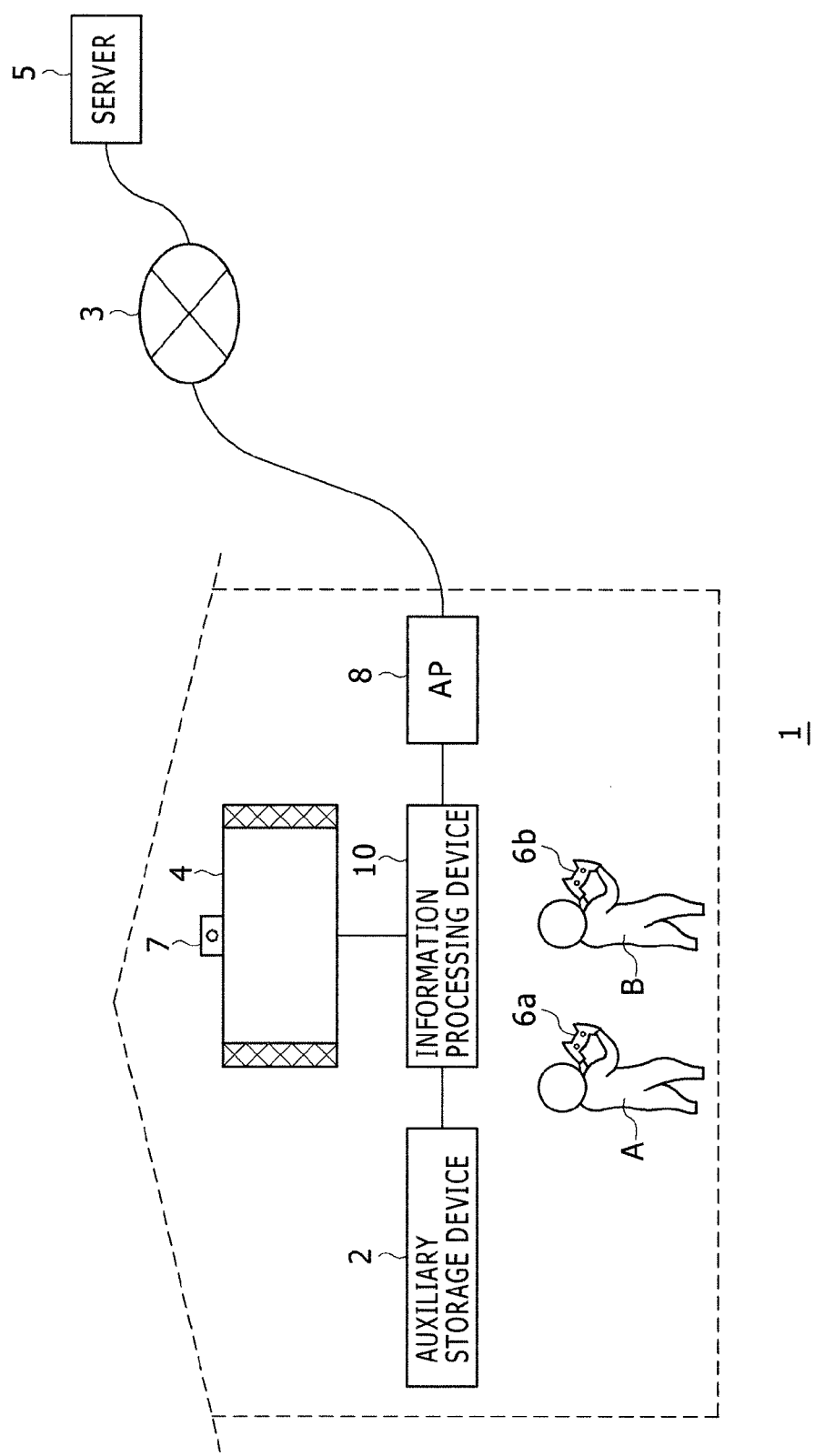
FIG. 1 is a diagram showing an information processing system in an embodiment of the present disclosure.

FIG. 1 shows an information processing system 1 according to an embodiment of the present disclosure. The information processing system 1 includes an information processing device 10 as a user terminal and a server 5. An access point (hereinafter, referred to as "AP") 8 has functions of a wireless access point and a router. The information processing device 10 connects to the AP 8 in a wireless or wired manner and communicably connects to the server 5 on a network 3.

An auxiliary storage device 2 is a high-capacity storage device such as a hard disc drive (HDD) or a flash memory. It may be an external storage device that connects to the information processing device 10 by a universal serial bus (USB) or the like or may be a built-in storage device. An output device 4 may be a television having a display to output images and a speaker to output sounds or may be a computer display. The output device 4 may be connected to the information processing device 10 by a wiring cable or may be wirelessly connected thereto.

The information processing device 10 connects to an input device 6 operated by a user in a wireless or wired manner and the input device 6 outputs an operation signal indicating an operation result by the user to the information processing device 10. When accepting the operation signal from the input device 6, the information processing device 10 reflects it in processing of an operating system (OS, i.e. system software) or an application and makes the processing result be output from the output device 4. The input device 6 has plural input parts such as plural push operation buttons, analog sticks with which an analog amount can be input, and pivotal buttons.

When accepting the operation signal from the input device 6, the information processing device 10 reflects it in processing of an application and makes the processing result be output from the output device 4. In the information processing system 1, the information processing device 10 is a game device that executes a game and each of the input devices 6a and 6b (hereinafter, often referred to as the input device 6 generically) is an apparatus, such as a game controller, to provide the operation signal of a user to the information processing device 10. The input device 6 may be an input interface such as a keyboard and a mouse. A camera 7 as an imaging device is provided near the output device 4 and images a space around the output device 4. Although an example in which the camera 7 is attached to an upper part of the output device 4 is shown in FIG. 1, it may be disposed at a side part of the output device 4. In any case, the camera 7 is disposed at a position at which it can image a user located in front of the output device 4. The camera 7 may be a stereo camera.

The server 5 provides network services to users of the information processing system 1. The server 5 manages network accounts to identify the respective users and each user signs in the network services provided by the server 5 by using the network account. By signing in the network services from the information processing device 10, the user can register, in the server 5, save data of a game and trophies as virtual prizes won in game play.

In FIG. 1, a situation in which two users A and B are operating the input devices 6a and 6b as game controllers is shown. The users A and B operate the input devices 6a and 6b, respectively, to input a passcode for login. After being authenticated by the information processing device 10, they log in to the OS of the information processing device 10 and thereby can enjoy an application such as a game.

In recent years, a game in which the motion of a user is reflected in the motion of a game character has also appeared. In a game utilizing gesture of a user, the user does not need to hold the input device 6 and can intuitively move a character. In such a game, because the user does not use the input device 6 in the first place, it is preferable that user authentication is executed without use of the input device 6 also when the user logs in to the OS of the information processing device 10. It is meaningful in the information processing system 1 that the user can log in through simple user authentication irrespective of the kind of game to be played by the user after the login.

Therefore, in the information processing system 1 of the present embodiment, a technique by which user authentication can be easily executed by using a taken image by the camera 7 is provided.

Figure 2:
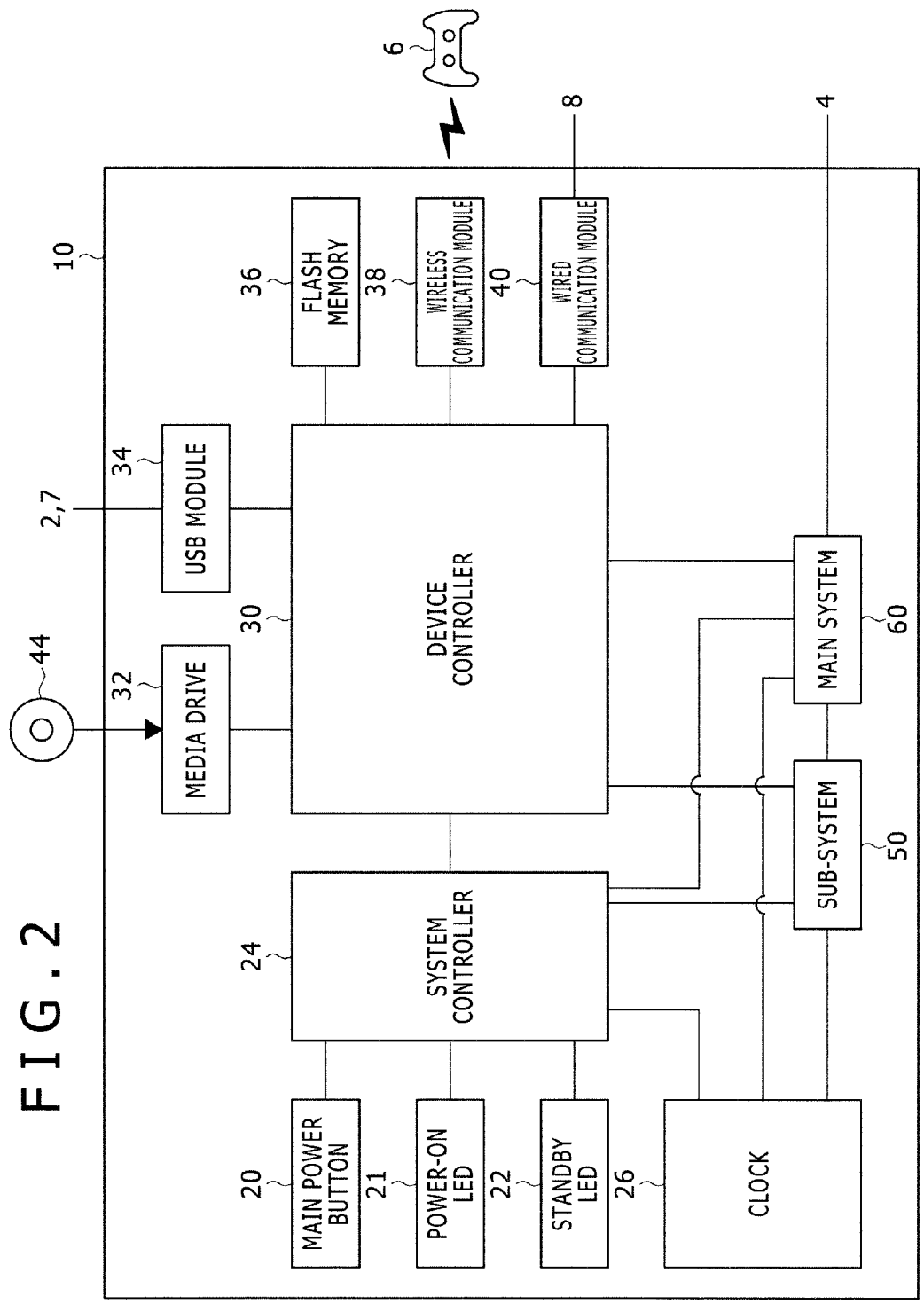
FIG. 2 is a diagram showing the internal configuration of an information processing device in the embodiment.

FIG. 2 shows the internal configuration of the information processing device 10. The information processing device 10 has a main power button 20, a power-ON light emitting diode (LED) 21, a standby LED 22, a system controller 24, a clock 26, a device controller 30, a media drive 32, a USB module 34, a flash memory 36, a wireless communication module 38, a wired communication module 40, a sub-system 50, and a main system 60.

The main system 60 includes a main central processing unit (CPU), a memory as a main storage device, a memory controller, a graphics processing unit (GPU), and so forth. The GPU is used mainly for arithmetic processing of a game program. These functions may be configured as a system on a chip and formed on one chip. The main CPU has functions to activate an OS and execute an application installed in the auxiliary storage device 2 under an environment provided by the OS.

The sub-system 50 includes a sub-CPU, a memory as a main storage device, a memory controller, and so forth and does not include a GPU. The number of circuit gates of the sub-CPU is smaller than the number of circuit gates of the main CPU and the operating power consumption of the sub-CPU is lower than that of the main CPU. The sub-CPU operates in a period during which the main CPU is in the standby state and its processing functions are limited in order to suppress the power consumption. The sub-CPU and the memory may be formed on different chips.

The main power button 20 is an input part to which an operation input from a user is made. It is provided on the front surface of a casing of the information processing device 10 and is operated to turn on or off power supply to the main system 60 of the information processing device 10. Hereinafter, that the main power supply is in an on-state means that the main system 60 is in the active state, and that the main power supply is in an off-state means that the main system 60 is in the standby state. The power-ON LED 21 is lit when the main power button 20 is switched on and the standby LED 22 is lit when the main power button 20 is switched off.

The system controller 24 detects pressing-down of the main power button 20 by the user. If the main power button 20 is pressed down when the main power supply is in the off-state, the system controller 24 acquires the pressing-down operation as an "on-instruction." On the other hand, if the main power button 20 is pressed down when the main power supply is in the on-state, the system controller 24 acquires the pressing-down operation as an "off-instruction."

The main CPU has a function to execute game programs installed in the auxiliary storage device 2 and a read-only memory (ROM) medium 44 whereas the sub-CPU does not have such a function. However, the sub-CPU has a function to access the auxiliary storage device 2 and a function to transmit and receive data to and from the server 5. The sub-CPU has only such limited processing functions and therefore can operate at relatively low power consumption compared with the main-CPU. These functions of the sub-CPU are executed when the main-CPU is in the standby state. Because the sub-system 50 is operating when the main system 60 is in the standby state, the information processing device 10 of the present embodiment keeps being in the sign-in state in the network services provided by the server 5.

The clock 26 is a real-time clock. It generates present date-and-time information and supplies it to the system controller 24, the sub-system 50, and the main system 60.

The device controller 30 is a large-scale integrated circuit (LSI) that carries out exchange of information among devices like a southbridge. As shown in the diagram, to the device controller 30, devices are connected, such as the system controller 24, the media drive 32, the USB module 34, the flash memory 36, the wireless communication module 38, the wired communication module 40, the sub-system 50, and the main system 60. The device controller 30 absorbs the differences in the electrical characteristics and the data transfer rate among the respective devices and controls the timing of data transfer.

The media drive 32 is a drive device that drives the ROM medium 44 that is loaded therein and in which application software such as a game and license information are recorded and reads out a program, data, and so forth from the ROM medium 44. The ROM medium 44 is a read-only recording medium such as an optical disc, a magneto-optical disc, or a Blu-ray disc.

The USB module 34 is a module that connects to an external apparatus by a USB cable. The USB module 34 may connect to the auxiliary storage device 2 and the camera 7 by USB cables. The flash memory 36 is an auxiliary storage device forming an internal storage. The wireless communication module 38 wirelessly communicates with e.g. the input device 6 based on a communication protocol such as the Bluetooth (registered trademark) protocol or the IEEE 802.11 protocol.

The wireless communication module 38 may be compatible with a third generation digital mobile phone system that complies with the International Mobile Telecommunication 2000 (IMT-2000) standard defined by the International Telecommunication Union (ITU) and furthermore may be compatible with a digital mobile phone system of another generation. The wired communication module 40 communicates with an external apparatus in a wired manner and connects to the network 3 via the AP 8 for example.

In the information processing system 1 of the present embodiment, if the user presses down the main power button 20 when the information processing device 10 is in the power-off state, the information processing device 10 turns on the main power supply to activate the OS (system software) and execute login processing for the user. In this login processing, the information processing device 10 functions as a face authentication system using an image taken by the camera 7. The operation of the information processing device 10 will be described below.

Figure 3:
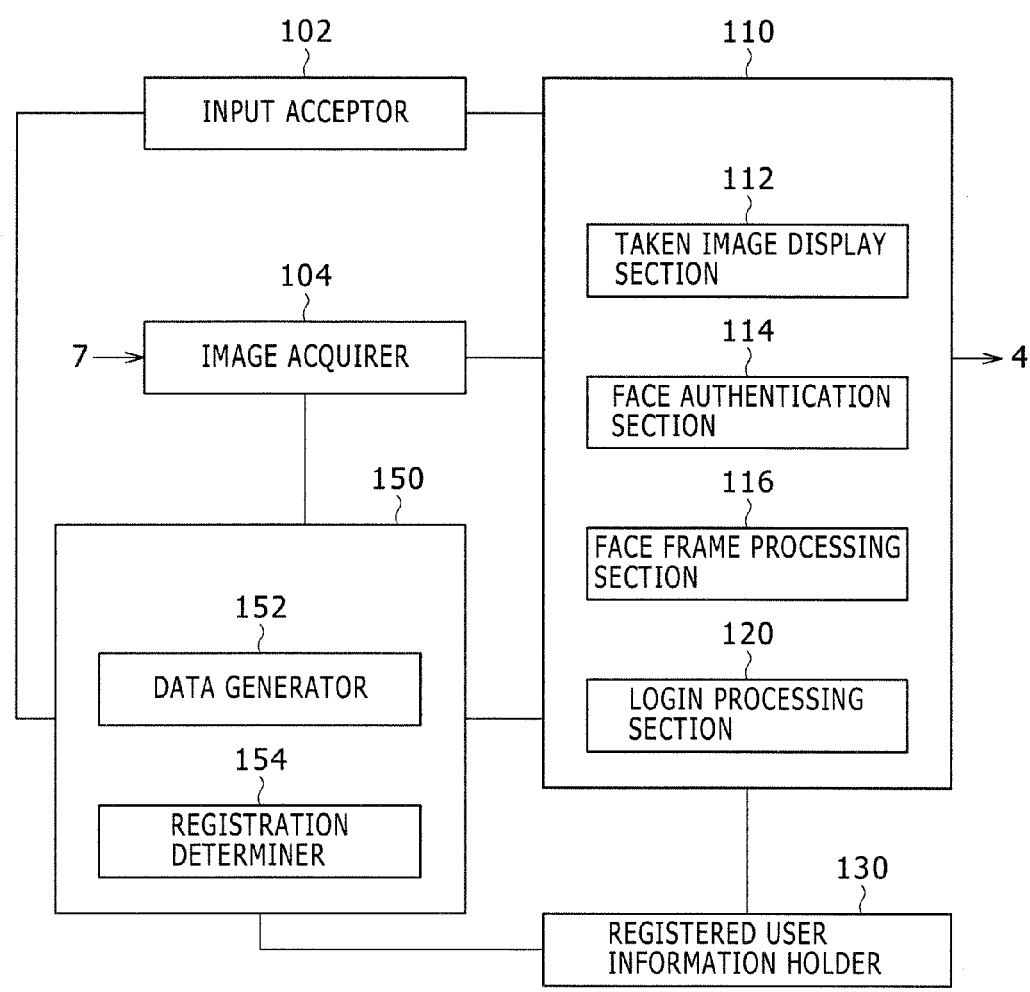
FIG. 3 is a diagram showing the functional block configuration of the information processing device in the embodiment.

FIG. 3 shows the functional block configuration of the information processing device 10. The information processing device 10 has an input acceptor 102, an image acquirer 104, a login controller 110, a registered user information holder 130, and a face identification data registration section 150. The login controller 110 has a taken image display section 112, a face authentication section 114, a face frame processing section 116, and a login processing section 120. The face identification data registration section 150 has a data generator 152 and a registration determiner 154.

The input acceptor 102 accepts operation information from a user and the image acquirer 104 acquires a taken image obtained by imaging by the camera 7 and stores it in a memory. The camera 7 shoots a spatial image at a predetermined cycle. Specifically, it shoots one spatial image per 1/30 seconds for example and provides the taken images to the image acquirer 104. The camera 7 is so disposed that its optical axis is oriented in the front direction of the output device 4 and therefore the camera 7 shoots a user who exists in front of the output device 4.

The respective elements described as functional blocks that execute various kinds of processing in FIG. 3 and FIG. 13 to be described later can be formed with circuit block, memory, and other LSIs in terms of hardware and are implemented by a program loaded into the memory and so forth in terms of software. Therefore, it is understood by those skilled in the art that these functional blocks can be implemented in various forms by only hardware or only software or a combination of them, and they are not limited to any.

In the present embodiment, the functions of the taken image display section 112, the face frame processing section 116, and the face identification data registration section 150 are implemented by a face authentication application. The functions of the face authentication section 114 are implemented by a face recognition engine and are automatically activated by the OS when the main power button 20 is pressed down. The face authentication application and the face recognition engine may be configured as one application.

One of characteristics of the information processing device 10 of the present embodiment is that it assists simple login operation of the user. To log in to the OS of the information processing device 10, the user should acquire a user account in advance and register it in the information processing device 10. Hereinafter, the user who has registered the user account in the information processing device 10 will be referred to as the "registered user."

The registered user information holder 130 holds various pieces of information relating to the registered user. Specifically, it holds face identification data, an online identification data (ID) (nickname on the network) of the user, a login passcode, and so forth as registered user information in association with the user account. The face identification data is feature data of a face image of the registered user but may be face image data itself.

The face identification data is data employed as a comparison target in face recognition processing by the face authentication section 114. It is generated by the face identification data registration section 150 to be stored in the registered user information holder 130 in accordance with a face recognition algorithm employed by the face authentication section 114. For example, the face identification data may be data obtained by extracting, as characteristics, the relative positions and sizes of parts of a face and the shapes of eye, nose, cheekbone, and jaw. Furthermore, the face identification data may be data extracted as difference data from standard data of the face image. In addition, it may be a statistic representing the distribution of the luminance vector and so forth. What kind of face identification data is to be extracted is determined depending on the employed face recognition algorithm. In the present embodiment, the face authentication section 114 employs a known face recognition algorithm.

First, description will be made about processing when a registered user logs in to the OS of the information processing device 10 in the state in which the registered user information has been stored in the registered user information holder 130. In this example, at least users A and B exist. The online ID of the user A is "HANAKO" and the online ID of the user B is "SACHIKO."

When the user presses down the main power button 20 of the information processing device 10, the main power supply of the information processing device 10 is turned on and the input acceptor 102 accepts information on the pressing-down of the main power button 20 as a login request from the user. When the input acceptor 102 accepts the login request, the respective functions in the login controller 110 are implemented. The login controller 110 has a function to determine whether or not to permit login of the user based on the result of face recognition of the user.

When the input acceptor 102 accepts the login request based on the pressing-down of the main power button 20, the taken image display section 112 reads out a taken image acquired by the image acquirer 104 from the memory and displays it on the output device 4, which is a display. A live image shot by the camera 7 is thereby displayed on the output device 4, so that the user present in front of the output device 4 is displayed on the output device 4.

Figure 4:
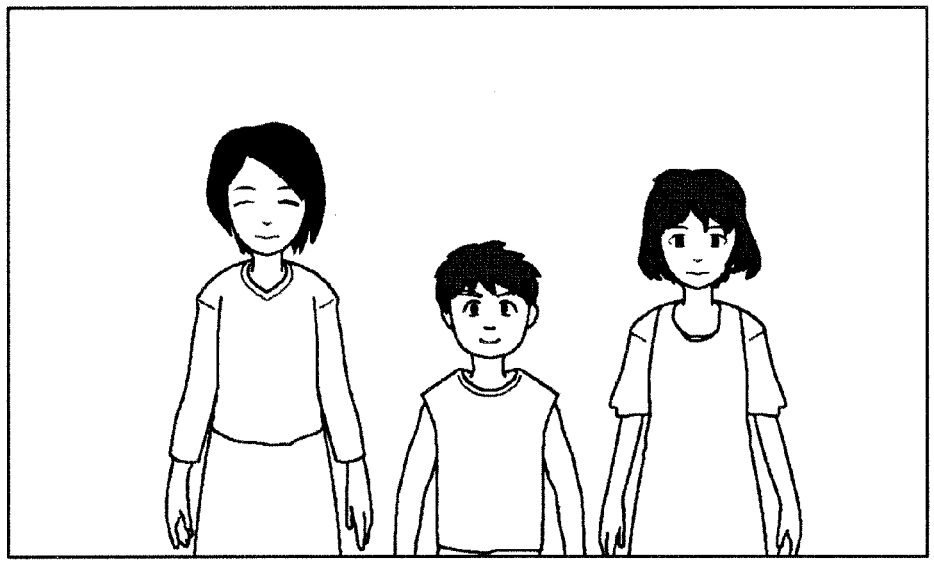
FIG. 4 is a diagram showing one example of a space shot by a camera in the embodiment.

FIG. 4 shows one example of the space shot by the camera 7. In this shot space, three users exist. A rectangular frame surrounding the users in FIG. 4 expresses the imaging range of the camera 7. The imaging range of the camera 7 defines the range displayed on the output device 4 as the live image but the live image may be part of the taken image. The face authentication section 114 extracts a part estimated to be a person's face in the taken image and derives feature data of this part. The face authentication section 114 then compares the derived feature data with face identification data held in the registered user information holder 130 and determines whether or not the extracted face is the face of a registered user.

Specifically, the face authentication section 114 derives the degrees of match between the feature data of the extracted face image of the user and the face identification data of all registered users held in the registered user information holder 130. This degree of match is numerically expressed. For example, the degree of match is derived in the form of a score out of 100. If the degree of match of a registered face image with the feature data surpasses 90, the face authentication section 114 determines that the imaged user is a registered user and identifies which registered user the imaged user is.

If plural face identification data whose degree of match surpasses 90 exist, the face authentication section 114 may determine that the imaged user is the registered user of the face identification data with which the best score is derived. If the face identification data whose degree of match surpasses 90 does not exist as the result of derivation of the degrees of match between the feature data of the face image of the user extracted from the taken image and the face identification data of all registered users, the face authentication section 114 determines that the user included in the taken image is not the registered user. In this manner, the face authentication section 114 detects a face image of a registered user existing in the taken image by using the face identification data held in the registered user information holder 130. As this face identification technique, a known technique may be used. In the present embodiment, this processing is positioned as first-stage face authentication.

Figure 5:
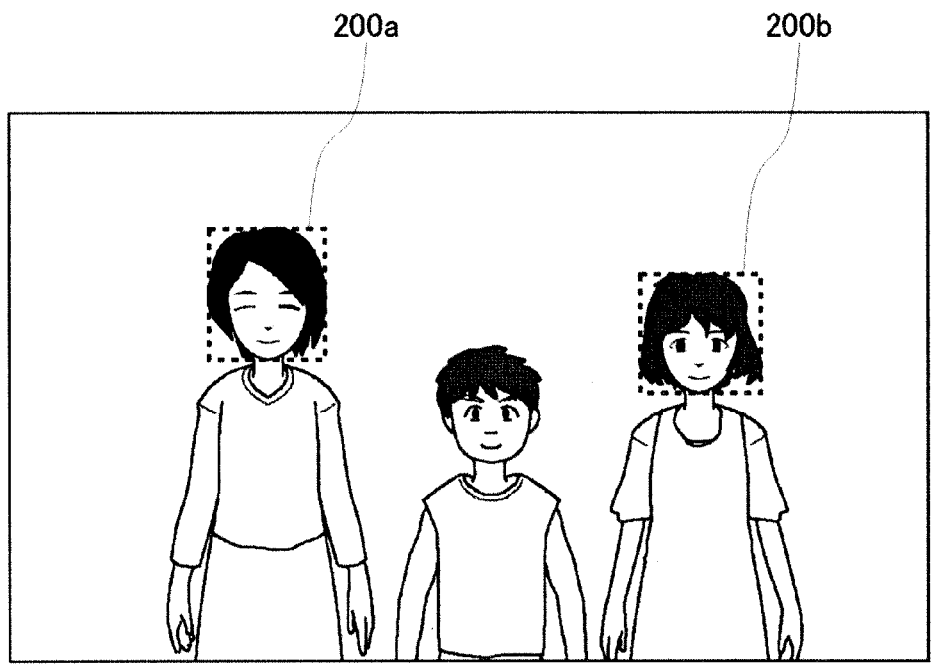
FIG. 5 is a diagram showing the result of face identification by a face authentication section in the embodiment.

FIG. 5 shows the result of face identification by the face authentication section 114. Here, it is determined that the left user is the user A and the right user is the user B and the middle user is not a registered user. The face authentication section 114 sets a face region 200a indicating the position of the face of the user A (online ID: HANAKO) in the taken image and a face region 200b indicating the position of the face of the user B (online ID: SACHIKO) in the taken image, and provides the face frame processing section 116 with information to identify the position coordinates of the face regions 200a and 200b and the imaged registered users. Hereinafter, an example will be shown in which the position coordinates are expressed by two-dimensional coordinates when the taken image is displayed on the display. However, the position coordinates may be coordinates defined on a video random access memory (VRAM). In any case, it is enough that the coordinates of the face regions 200a and 200b (hereinafter, often referred to as the face region 200 generically) and the coordinates of face frames to be described later are expressed on a common coordinate system.

Each face region 200 may be set as a rectangular region in contact with the contour of the face in the taken image. Alternatively, it may be set as a rectangular region slightly wider than the facial contour. Here, the contour of the face means a contour including the head hair. However, the contour of the face may be set excluding the head hair if the head hair is not taken into consideration in face recognition processing of the face authentication section 114 for example. The size and shape of the face region 200 are determined by the size and shape of the face of the user in the taken image. Therefore, the size and shape of the face region 200 differ for each user. Furthermore, even for the same user, the size and shape of the face region 200 change depending on the distance from the camera 7.

The information that is provided from the face authentication section 114 to the face frame processing section 116 and is to identify the registered user may be the user account of the registered user or may be the online ID. The face authentication section 114 provides the face frame processing section 116 with the position coordinates of the face region 200 in association with the registered user identification information. Specifically, in the example shown in FIG. 5, the face authentication section 114 provides the face frame processing section 116 with a combination of the face region 200a and the identification information of the user A and a combination of the face region 200b and the identification information of the user B.

The face frame processing section 116 displays a face frame on the output device 4 for the registered user detected by the face authentication section 114. This face frame is displayed in order for the registered user to move the face and dispose it in the face frame when logging in. Therefore, the registered user is allowed to log in to the information processing device 10 by putting the user's own face in the face frame displayed on the output device 4.

Figure 6:
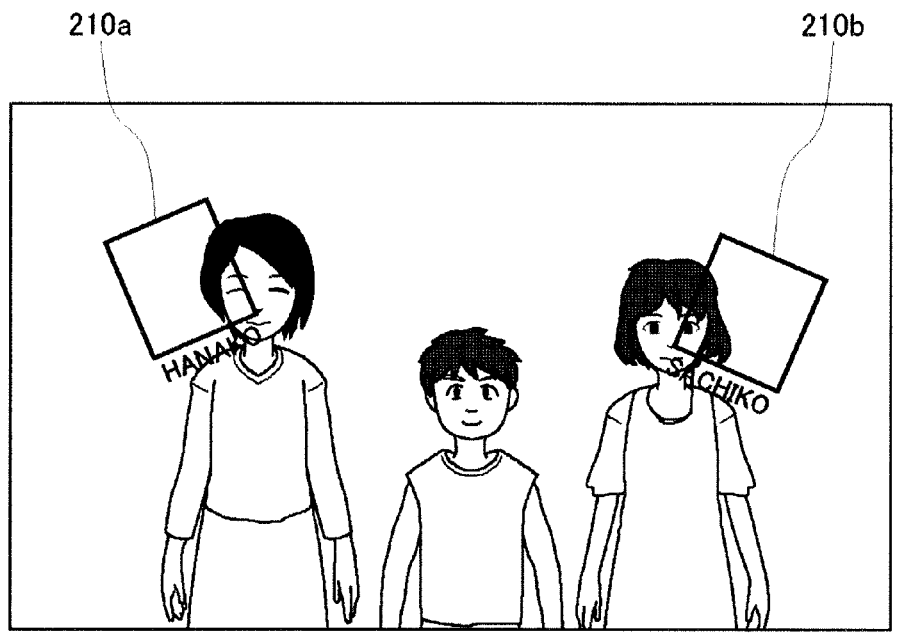
FIG. 6 is a diagram showing a login screen including face frames displayed on an output device in the embodiment.

FIG. 6 shows a login screen including face frames displayed on the output device 4. The face frame processing section 116 displays face frames 210a and 210b (hereinafter, often referred to as the face frame 210 generically) for registered users based on the information that is provided from the face authentication section 114 and is to identify the position coordinates of the face regions 200a and 200b and the imaged registered users. In this example, the face frame processing section 116 displays the face frame 210a for the user A and displays the face frame 210b for the user B. At this time, the face frame processing section 116 displays the online ID of the user A near the face frame 210a and displays the online ID of the user B near the face frame 210b. This allows the users A and B to come to know that the own face is properly recognized and prompts them to move the face into the face frames 210a and 210b.

If an online ID different from the own online ID is displayed near the face frame 210 displayed near the own face, the user can come to know that the face recognition is not properly carried out and therefore does not put the face in the face frame 210. Additional information, such as the degree of match between the registered data of a registered user and the shot face image, derived when this registered user is identified in the first-stage face authentication, may be further displayed near the face frame 210. This makes it easier for the user to recognize whether or not the face recognition is properly carried out.

Because the middle user is not a registered user, the face frame 210 is not displayed. However, for the user who is not a registered user, an indication showing that the user is not determined as a registered user may be displayed near a region estimated to be a person's face. For example, displaying character information such as "unknown" or "unregistered" allows the user to find that the user is unregistered or that the feature data of the already-registered face image is improper. However, it is also possible that authentication is temporarily unsuccessful due to the orientation of the user's face or any blocking object. Therefore, a predetermined rule may be set, such as a rule that such information is displayed if the unsuccessful state continues for a predetermined time or longer.

The face frame processing section 116 gives an ID to each of the face frames 210 and provides the face authentication section 114 with face frame IDs, the position coordinates of the face frames 210, and the identification information of the users for which the face frames 210 are displayed. The position coordinates of the face frame 210 provided to the face authentication section 114 by the face frame processing section 116 may be the position coordinates of the face frame 210 itself or may be the coordinates of a rectangle circumscribed about the face frame 210. Hereinafter, the position coordinates of the face frame 210 itself and the position coordinates of a rectangle circumscribed about the face frame 210 will be referred to as the position coordinates of the face frame collectively. The position coordinates of the face frame are used to detect a face image of the user in the face authentication section 114.

For example, the face frame processing section 116 sets "ID1" as the face frame ID of the face frame 210a and sets "ID2" as the face frame ID of the face frame 210b. The face frame processing section 116 provides the face authentication section 114 with a combination of "ID1," the position coordinates of the face frame 210a, and the identification information of the user A and a combination of "ID2," the position coordinates of the face frame 210b, and the identification information of the user B. Furthermore, the face frame processing section 116 provides the login processing section 120 with the face frame IDs and the identification information of the users for which the face frames 210 are displayed. Therefore, in this case, the face frame processing section 116 provides the login processing section 120 with a combination of "ID1" and the identification information of the user A and a combination of "ID2" and the identification information of the user B.

Figure 7:
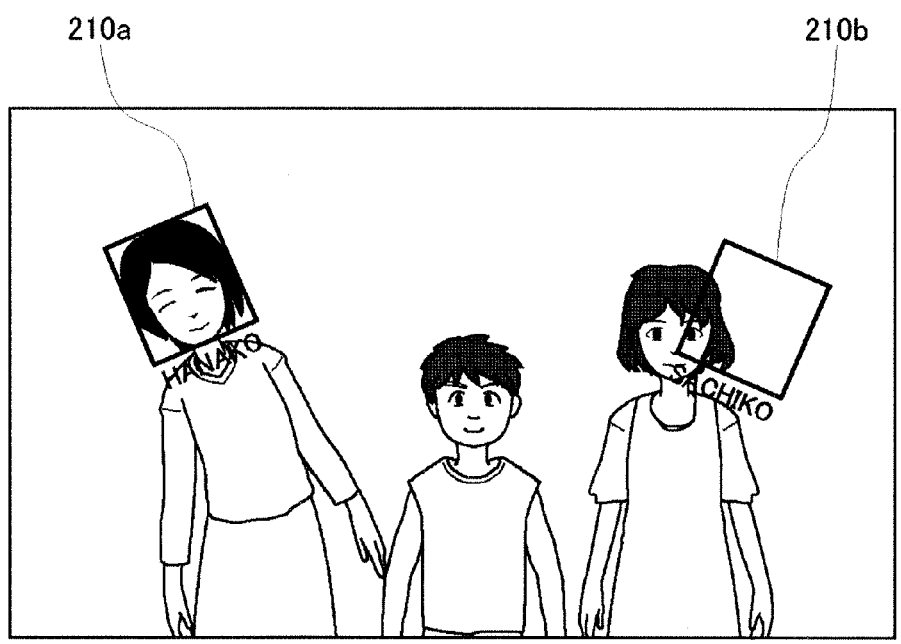
FIG. 7 is a diagram showing the login screen in which a user puts the face in a face frame in the embodiment.

FIG. 7 shows a login screen in which a user has put the face in a face frame. Here, a state is shown in which the user A has moved the face and body in such a manner that the face enters the face frame 210a displayed on the output device 4. The face authentication section 114 monitors whether a person's face is put in the face frame 210. If a face is put therein, the face authentication section 114 determines whether the face put in the face frame 210 is the face of the registered user by using face identification data held in the registered user information holder 130.

The face authentication section 114 can monitor whether a person's face is put in the face frame 210 based on the position coordinates of the face frame 210 provided from the face frame processing section 116. The face recognition algorithm is as described above. When estimating that a person's face is included in the face frame 210, the face authentication section 114 derives the feature data of this part and compares the feature data with face identification data held in the registered user information holder 130 to determine that the extracted face is the face of the registered user.

The face authentication section 114 has been notified of the combination of the face frame ID, the position coordinates of the face frame 210, and the identification information of the user for which the face frame 210 is displayed from the face frame processing section 116, and compares the feature data of the face image of the person included in the face frame 210 with the face identification data of the user for which the face frame 210 is displayed. Because having been notified of the user that should be included in the face frame 210 in advance, the face authentication section 114 does not need to compare the feature data of the face included in the face frame 210 with the face identification data of all registered users and thus can efficiently execute the face recognition processing. The face authentication section 114 may temporarily store the face image of the user extracted from the taken image in the first-stage face authentication or the feature data thereof, described with FIG. 5, and include also it in the comparison targets. Details will be described later.

The face authentication section 114 may determine that the face of the registered user is put in the face frame 210 by detecting that the face of the registered user has been put in the face frame 210 for a predetermined time (e.g. several seconds). As a result, in the example of FIG. 7, the face authentication section 114 determines that the face that has entered the face frame 210a is the face of the user A. In the present embodiment, this processing is positioned as second-stage face authentication.

Through the first-stage and second-stage face authentications, the user authentication at the time of login ends. The action of putting a face in the face frame 210 by a user is made based on the user's intention to log in. When the user does not desire to log in, the user does not need to put the face in the face frame 210. As above, in the present embodiment, the registered user who will possibly log in is detected by the first-stage face authentication and the registered user having an intention to log in is detected by the second-stage face authentication. The registered user is authenticated by only carrying out simple operation of putting the face in the face frame 210. Thus, the working burden on the user at the time of login can be made very small.

When detecting that the face of the user A has entered the face frame 210a, the face authentication section 114 notifies the login processing section 120 of the face frame ID to identify the face frame 210a and the user identification information to identify the user A. As already described, the login processing section 120 has been notified of the face frame IDs and the identification information of the users for which the face frames 210 are displayed from the face frame processing section 116 in advance. When being notified of the face frame ID and the user identification information from the face authentication section 114, the login processing section 120 extracts the user identification information associated with the face frame ID notified from the face frame processing section 116 and determines the match between the pieces of user identification information. Here, corresponding to the face frame ID of ID1, the identification information of the user A is notified as both of the pieces of identification information from the face authentication section 114 and the face frame processing section 116. Therefore, the login processing section 120 recognizes that the face of the user A is detected in the face frame 210a displayed for the user A. Due to this, the login processing section 120 allows the user A to log in to the information processing device 10.

As described above, in the present embodiment, the login controller 110 causes a registered user to log in after carrying out the user authentication by face authentications of two stages. For example, after a person's face is detected in the first shot image and whether or not the person with the detected face is a registered user is determined in the first-stage face authentication processing, face authentication processing does not need to be executed unless a new user is shot. In this case, the detected person's face is subjected to tracking processing in the shot image and the position coordinates of the face image in the shot image are constantly provided to the face frame processing section 116. It is also possible to employ a configuration in which face authentication is executed at a predetermined cycle and a detected person's face is subjected to tracking processing in the time zone during which face authentication is not executed.

The first-stage face authentication and the second-stage face authentication may be concurrently executed at different cycles. For example, the first-stage face authentication and the second-stage face authentication are concurrently operated at a cycle of one second and a cycle of 1/60 seconds, respectively. Due to this, particularly when a large number of users exist at a time, the speed of the login processing can be enhanced compared to the case in which the face authentications of the two stages are executed one person by one person. By setting the operating cycle of the first-stage face authentication long and setting the operating cycle of the second-stage face authentication short as described above, transition from the first stage to the second stage can be rapidly made with a suppressed processing burden.

After login of one registered user through the second-stage face authentication processing, if a registered user who has not yet logged in is being shot, the login screen may continue to be displayed until this registered user logs in. In this case, it is preferable for the face frame processing section 116 to erase the face frame 210 displayed for the user who has logged in from the output device 4. If there is a limit that only one registered user is allowed to log in through this face authentication, transition to the home screen provided by the OS of the information processing device 10 or the like may be made after login of one registered user.

If the face authentication section 114 cannot detect a face in the face frame 210 for a predetermined time after the face frame 210 is displayed in the login screen, the login processing by face authentication may end and transition to login processing by use of the input device 6 may be made. Furthermore, if the user does not desire the login processing by face authentication, the login processing by face authentication may be ended by using the input device 6 for example and transition to login processing by use of the input device 6 may be made.

Figure 8:
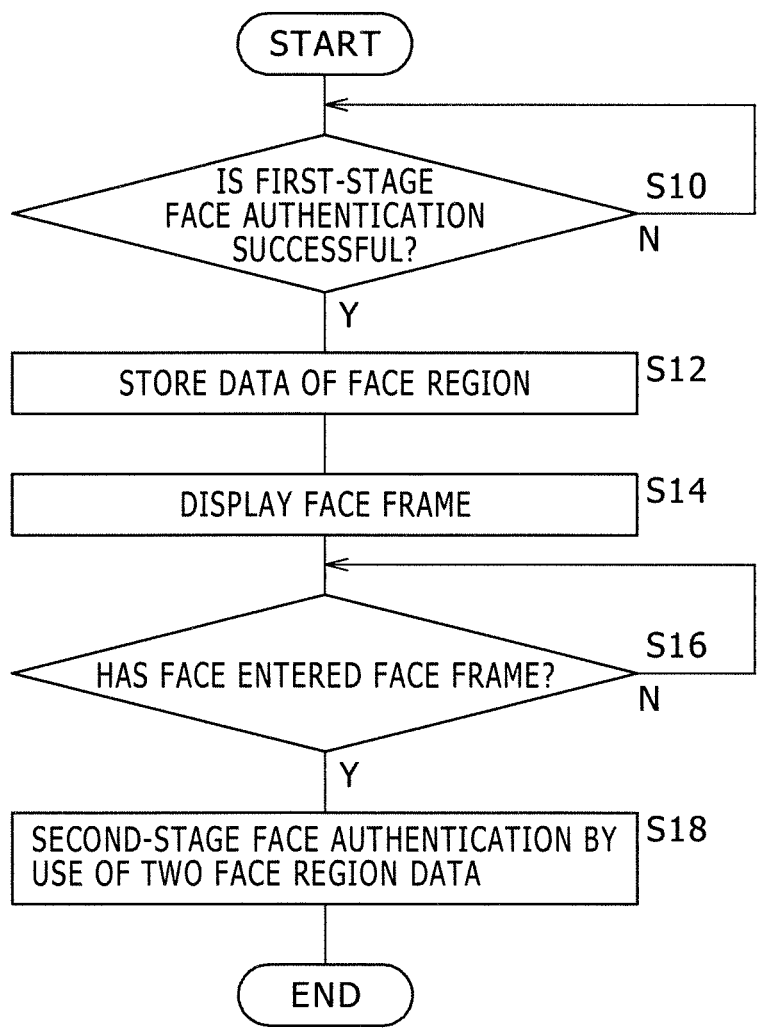
FIG. 8 is a flowchart showing the procedure of processing in which a login controller of the information processing device in the embodiment determines whether or not to permit login by first-stage and second-stage face authentications.

Next, description will be made about the operation of the information processing device 10 in the case of using the face image acquired in the first-stage face authentication for the second-stage face authentication as described above. FIG. 8 is a flowchart showing the procedure of processing in which mainly the login controller 110 of the information processing device 10 determines whether or not to permit login by the first-stage and second-stage face authentications. First, the face authentication section 114 extracts a part estimated to be a person's face in a shot image as described above and makes a comparison with face identification data held in the registered user information holder 130 to thereby determine that the extracted face is the face of a registered user (S10).

During the period in which a face is not detected or the detected face is not the face of a registered user, i.e. the first-stage face authentication is unsuccessful, the face detection and the determination processing are repeated at a predetermined time interval (N of S10). If it is determined that the detected face is the face of a registered user and the first-stage face authentication succeeds (Y of S10), the face authentication section 114 temporarily stores, in an internal memory or the like (not shown), the image of the face region extracted from the shot image at this time or the feature data thereof in association with the identification information of the corresponding registered user (S12). The face authentication section 114 notifies the face frame processing section 116 of the position coordinates of the face region and the identification information of the registered user as described above.

This causes the face frame processing section 116 to display face frame and online ID on the output device 4 as shown in FIG. 6 (S14). Along with this, the face frame processing section 116 notifies the face authentication section 114 of the face frame ID, the position coordinates of the face frame, and the identification information of the corresponding registered user. In response to this, the face authentication section 114 performs monitoring until a person's face enters the face frame or a predetermined range including the periphery thereof (N of S16). If it can be detected that a person's face has entered the relevant range (Y of S16), the face authentication section 114 derives the feature data of this face region. The face authentication section 114 makes a double determination by comparing the derived feature data with both of face identification data held in the registered user information holder 130 (hereinafter, often referred to as "long-term stored data") and the feature data of the face region extracted from the shot image in the first-stage face authentication to be temporarily stored in S12 (hereinafter, often referred to as "short-term stored data") (S18).

Specifically, first the feature data of the face in the face frame is compared with the long-term stored data. If it is determined that these data do not match, comparison with the short-term stored data is tried next. If it is determined that both correspond to the face of the same person through this comparison, the face authentication section 114 concludes that the face in the face frame is the face of the registered user identified by the first-stage face authentication. That is, the face authentication section 114 changes the failure of the authentication with the long-term stored data to success.

For example, if the success rate of the authentication with the long-term stored data is 80%, executing the same authentication processing twice decreases the success rate of the authentication to about 60%. If tilting the face changes e.g. the roundness of a cheek, possibly the success rate further decreases. In this case, possibly a situation occurs in which the second-stage face authentication does not succeed and the user cannot log in although it is authenticated that a detected face is the own face in the first-stage face authentication, so that the user will be given stress. With the above-described configuration, the success rate of the authentication can be enhanced by using the image shot immediately before the second-stage face authentication.

In the present embodiment, the main meaning of the second-stage face authentication is checking whether or not a user has an intention to log in and the detection itself of the registered user is assumed mainly by the first-stage face authentication. By doubly executing the second-stage face authentication as described above to loosen the authentication criterion, authentication having consistency with such a difference in the meaning can be realized. Furthermore, by using the image obtained at the time of the first-stage face authentication, the above-described effects can be achieved without increasing labor imposed on the user.

The order of the authentication with the long-term stored data and the authentication with the short-term stored data and the rule of derivation of the determination result are not limited to the above-described ones. Both authentications may be simultaneously carried out and scores representing the results of them may be integrated. Alternatively, the authentication with the short-term stored data may be carried out first. In the above description, to loosen the authentication criterion to enhance the success rate of the authentication, the union of success events of both is determined as the final success event. However, depending on the purpose, the authentication criterion may be made stricter. That is, the intersection of success events of the authentication with the long-term stored data and the authentication with the short-term stored data may be deemed as the final success event. In any case, multifaceted authentication is enabled by using two kinds of face identification data different in the acquisition timing.

Next, description will be made about processing in which the face identification data registration section 150 stores face identification data (above-described "long-term stored data") in the registered user information holder 130. At a stage where the face identification data should be stored, the data generator 152 of the face identification data registration section 150 reads out data of a shot image acquired by the image acquirer 104 from the memory and extracts a part estimated to be a person's face in this image to derive feature data.

The stage where the face identification data should be stored is typically a case in which a user newly desires user registration. In this case, when accepting a request for start of user registration from the user via the input device 6, the input acceptor 102 notifies the face identification data registration section 150 of this. Meanwhile, the camera 7 starts shooting of the face of this user and the face identification data registration section 150 reads out data of the relevant image acquired by the image acquirer 104 from the memory. The face identification data registration section 150 then extracts the face region and derives feature data as described above. In addition, it stores the derived data in the registered user information holder 130 in association with a new online ID that is input by the user and accepted by the input acceptor 102 and user identification information such as an account given by the device.

The face identification data stored here differs depending on the face recognition algorithm employed by the face authentication section 114 as described above and may be either feature data or face image data itself. As one of face recognition algorithms, there is a method in which the degree of match is calculated based on a difference image between a shot face image and a face image registered in advance and the distance from an eigenspace of a difference image group acquired in advance (refer to e.g. Japanese Patent Laid-open No. 2002-157596). Not only in this technique but in authentication based on a pixel value set, such as authentication in which block matching is performed between an image shot at the time of the authentication and a registered image and authentication in which probability density is obtained based on the luminance distribution vector of an image with a statistic such as a covariance matrix, the authentication accuracy is susceptible to the face image as the source of the registered data.

For example, possibly the overall luminance and the angle of light shining on a face greatly differ between an image shot under natural light incident from a window and an image shot under indoor illumination at night. When these images are compared, the accuracy of derivation of the degree of match and hence the authentication accuracy tends to be low compared with when images shot under the same illumination environment are compared. Such a change in the illumination environment is caused due to various factors such as time zone, weather, whether a curtain is opened or closed, and which illumination lamp is lit. The authentication accuracy possibly changes due to change in not only the illumination environment but various conditions such as the orientation of the face, whether glasses and hat are worn, hair length and hairstyle, whether the face is shaved, and whether before or after tanning.

Therefore, in the case of statistical authentication, it is preferable that a statistic is calculated from images in as many states as possible at the learning stage of the statistical authentication. In the case of performing block matching with each registered image, it is preferable that registered images in as many states as possible are stored. However, actually there is a limit to creation of such states by the user oneself. Therefore, the data generator 152 performs a predetermined processing treatment for a face image of the user shot at the time of registration to thereby enhance the authentication accuracy with a small burden on the user.

Figure 9:
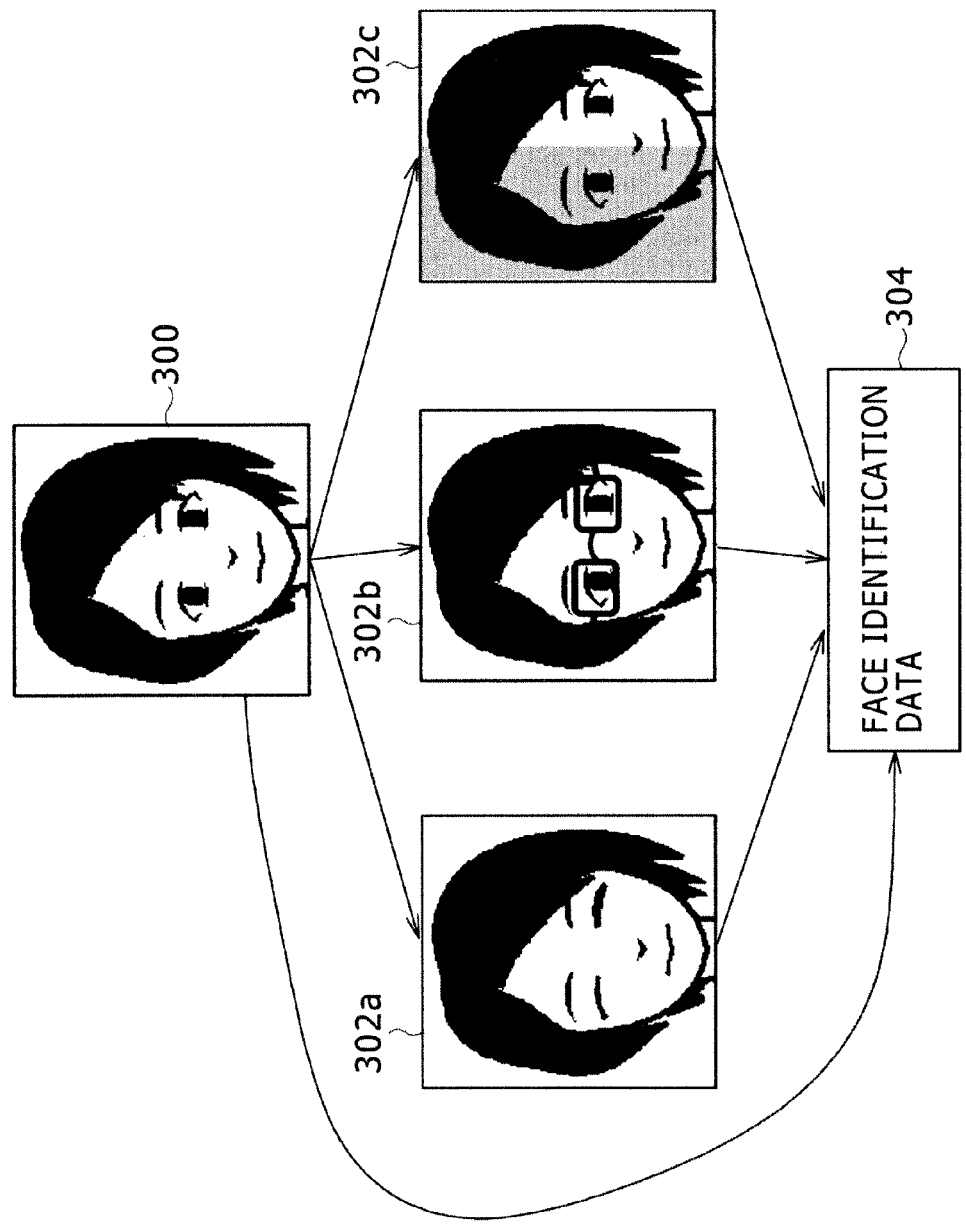
FIG. 9 is a diagram schematically showing the procedure of generation of face identification data from a shot image by a data generator in the embodiment.

FIG. 9 schematically shows the procedure of generation of face identification data from a shot image by the data generator 152. First, at a stage where face identification data should be stored, the data generator 152 extracts an image 300 representing a face region from an image shot by the camera 7. This processing may be similar to the processing of face detection executed by the face authentication section 114. The data generator 152 generates after-processing images 302*a*, 302*b*, and 302*c* by performing predetermined processing for the image 300 of this face region. The contents of the processing performed here are set inside the data generator 152 in advance.

In the case of FIG. 9, the after-processing image 302*a* is an image of a smiley face obtained by applying a predetermined distortion filter to the eye region in the original image 300. It may be created by morphing with a smiley face image of an average face. The after-processing image 302*b* is an image synthesized by superimposing an image of glasses on the original image 300. The after-processing image 302*c* is an image in which the luminance is partially lowered in such a manner that the right half of the face is shaded. In this case, further, the incident angle of predetermined light may be assumed and a range in which a shadow is made may be calculated as a region in which the luminance is lowered in consideration of also the concavity and convexity of the face, such as the nose. At this time, the incident angle of light may be changed to give the shadow in plural patterns. Instead of merely giving the shadow, the luminance of a part illuminated with light may be increased.

Other examples of the image processing will be as follows: the luminance is totally changed; the orientation (any of the rotational angles in the yaw/pitch/roll directions or a combination thereof) of a face is changed by affine transformation; a beard image with a mustache, whisker, jaw beard, or the like is combined; a hair image of any of various hairstyles is combined; an image of an accessory such as a hat or mask is combined; a region of a front hair or beard is deleted and the color of the region is turned to a flesh color; the shape of parts of the face, such as cheek, mouth, and eyebrow, is deformed by morphing or the like; and the color of the skin is darkened or lightened.

Moreover, shot images of a face in plural orientations (any of the rotational angles in the yaw/pitch/roll directions or a combination thereof) may be acquired by shooting a user from plural directions by the camera 7 and a face image in an intermediate orientation of these orientations may be generated as an after-processing image. For example, from shot images of a face oriented in the front and lateral directions, an after-processing image of the face oriented in an intermediate direction of these directions, i.e. in an oblique direction, is generated. The "intermediate direction" may be an arbitrary direction among the plural directions in which the shooting is performed and the number thereof is also not limited. To the processing, a general technique to generate an interpolated image from plural images may be applied.

Besides, any of face processing methods based on general image processing techniques may be employed. In the case of individually making comparison with each registered image, one after-processing image may be created by combining plural kinds of processing. The data generator 152 generates face identification data 304 by using the image 300 of the original face region and the after-processing images 302a, 302b, and 302c and stores it in the registered user information holder 130. As described above, depending on the algorithm used for authentication, data of each image or part thereof may be individually stored as it is or data obtained by subjecting all images to statistical processing may be stored. Due to this, for one registered user, authentication in consideration of also many assumed states can be realized and stable login is enabled without labor of reregistration in whatever state.

In the above description, a case in which a user requests new registration is exemplified as a stage where face identification data should be stored. In the present embodiment, further other opportunities are set to increase the frequency of update of the face identification data and keep the accuracy of authentication processing. For this purpose, the registration determiner 154 of the face identification data registration section 150 determines the timing when face identification data is newly stored (registered). Specifically, the registration determiner 154 deems timing when a user makes a request for registration, such as new registration or additional registration, as the timing of registration of face identification data. Furthermore, when the first-stage authentication succeeds and when the second-stage authentication succeeds, if a face image shot and detected at the timing satisfies a predetermined condition, the registration determiner 154 determines this timing as the timing of registration of this face image.

When determining that the present timing is the timing of registration, the registration determiner 154 notifies the data generator 152 of this. This causes the data generator 152 to store generated face identification data in the registered user information holder 130. The data generator 152 may always perform the above-described image processing at all timings or may skip it depending on the timing. For example, when determining whether or not to register face identification data based on a face image detected at the time of authentication, the registration determiner 154 may simultaneously determine also whether or not to perform image processing and notify the data generator 152 of the determination result.

Figure 10:
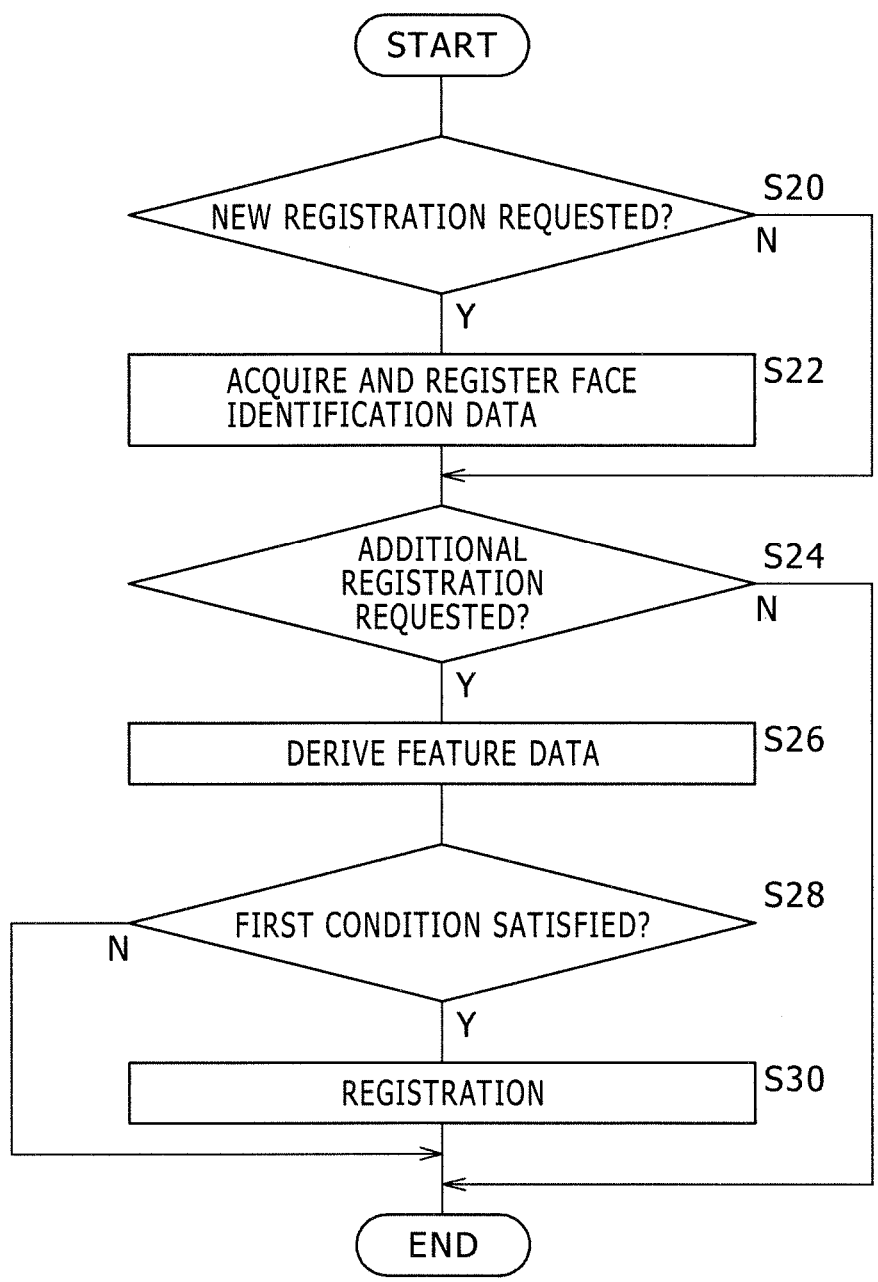
FIG. 10 is a flowchart showing the procedure of processing in which a face identification data registration section in the embodiment registers the face identification data with determination of the timing when it should be registered.
Figure 11:
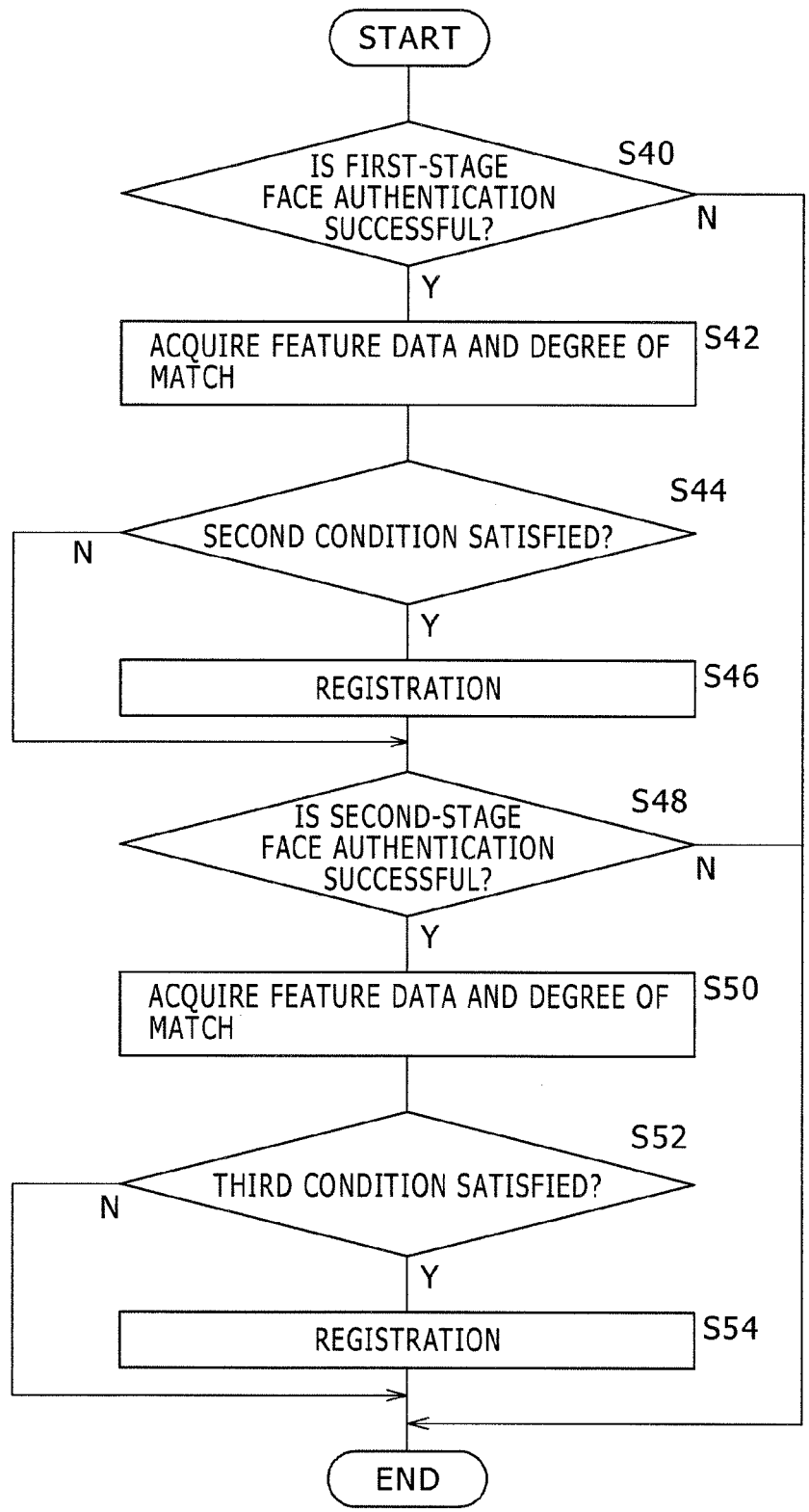
FIG. 11 is a flowchart showing the procedure of the processing in which the face identification data registration section in the embodiment registers the face identification data with determination of the timing when it should be registered.

FIGS. 10 and 11 are flowcharts showing the procedure of processing in which the face identification data registration section 150 registers face identification data with determination of the timing when it should be registered. Referring first to FIG. 10, when a user makes an input to request new registration (Y of S20), the data generator 152 reads out data of a shot image acquired by the image acquirer 104 and extracts an image of a face region as described above. The data generator 152 then generates face identification data by arbitrarily performing processing and so forth. Because the registration determiner 154 determines all timings of a request for new registration as the timing when face identification data should be registered, the data generator 152 stores the generated data in the registered user information holder 130 (S22).

If a registered user who has already finished new registration makes an input to request additional registration of the user's own face on another opportunity (N of S20, Y of S24), the camera 7 starts shooting of this user and the data generator 152 reads out data of a shot image acquired by the image acquirer 104. The data generator 152 then extracts a face region and derives feature data of this region (S26). The additional registration possibly occurs when the user oneself becomes aware of the necessity for registration due to the elapse of a certain amount of time from the previous registration or change in the state of the user for example.

The registration determiner 154 reads out already-registered face identification data from the registered user information holder 130 based on an online ID input by the user or the like and compares it with the feature data derived by the data generator 152 (S28). The generation of feature data and the comparison with face identification data are basically the same as the processing executed by the face authentication section 114 at the time of authentication processing. Therefore, it is also possible to employ a configuration in which these kinds of processing are entrusted to the face authentication section 114 and the data generator 152 only acquires feature data and the registration determiner 154 only acquires the comparison result thereof.

When the comparison result satisfies a first condition set in advance, the registration determiner 154 determines that the present timing is the timing when the face image shot at this time should be registered and notifies the data generator 152 of this (Y of S28). This causes the data generator 152 to add the feature data generated in S26 to the face identification data associated with the corresponding user in the registered user information holder 130 (S30). The first condition is set about the degree of match between the feature data of the face image extracted from the shot image and the already-registered face identification data of the corresponding user. For example, if the degree of match is too low, there is a possibility of masquerading by a different person or erroneous input of the online ID and therefore new registration is not carried out.

Conversely, if the degree of match is too high, registering similar data again will not contribute to the authentication accuracy at all and therefore new registration is not carried out. Therefore, for the degree S of match ($0 \le S \le 100$), a condition of e.g. $s1 \le S \le s1'$ ($s1 < s1'$) is set as the first condition. However, this does not intend to limit the first condition to this format and only either one of the lower limit s1 and the upper limit s1' may be set for the degree S of match. If the comparison result does not satisfy the first condition in S28, e.g. an image for notifying the user of this is displayed and the processing ends without registration (N of S28).

FIG. 11 shows a processing procedure when new face identification data is automatically registered according to need by utilizing the timing of actual login by a user who has already finished registration. In this case, the face identification data registration section 150 acquires the necessary data from the login controller 110. The face identification data registration section 150 then determines whether or not new registration should be carried out based on it and thereafter executes registration processing.

First, if the first-stage face authentication succeeds (Y of S40), the face authentication section 114 of the login controller 110 supplies the face identification data registration section 150 with the feature data of the face image extracted from the shot image at the time of this face authentication, the online ID of the registered user identified about it, the degree of match with the face identification data of this registered user, derived as the authentication result (S42). At this time, in addition to the degree of match with the face identification data of the identified registered user, the degree of match with the face identification data of other users may also be supplied.

The registration determiner 154 determines whether or not this degree of match satisfies a second condition set in advance (S44). If the second condition is satisfied, the registration determiner 154 determines that the present timing is the timing when the face image used for the authentication in S40 should be registered and notifies the data generator 152 of this (Y of S44). This causes the data generator 152 to add the feature data acquired in S42 to the face identification data associated with the corresponding user in the registered user information holder 130 (S46). The registration is not carried out if the second condition is not satisfied (N of S44).

Subsequently, if the second-stage face authentication succeeds (Y of S48), the face authentication section 114 of the login controller 110 supplies the face identification data registration section 150 with the feature data of the face image in a face frame, the online ID of the registered user identified about it, and the degree of match with face identification data (S50). At this time, in addition to the degree of match with the face identification data of the identified registered user, the degree of match with the face identification data of other users may also be supplied. The registration determiner 154 then determines whether or not this degree of match satisfies a third condition set in advance (S52).

If the third condition is satisfied, the registration determiner 154 determines that the present timing is the timing when the face image used for the authentication in S48 should be registered and notifies the data generator 152 of this (Y of S52). This causes the data generator 152 to add the feature data acquired in S50 to the face identification data associated with the corresponding user in the registered user information holder 130 (S54). The registration is not carried out if the third condition is not satisfied (N of S52). Naturally, the registration is not carried out also when the first-stage or second-stage face authentication is unsuccessful (N of S40, N of S48).

The second condition used in S44 and the third condition used in S52 are set based on a policy similar to that on the first condition described with reference to FIG. 10 qualitatively. For example, for the degree S of match with the face identification data of the registered user identified because of e.g. the highest degree of match in the face authentication by the face authentication section 114, a condition of e.g. $s2 \leq S \leq s2'$ ($s2 < s2'$) is set as the second condition and a condition of e.g. $s3 \leq S \leq s3'$ ($s3 < s3'$) is set as the third condition. Moreover, for the degree Mi of match with the face identification data of another user i ($0 < i \leq n$, n is the number of other users), a condition of e.g. $Mi \leq m2$ is set as the second condition and a condition of e.g. $Mi \leq m3$ is set as the third condition.

When all conditions about the degrees S and Mi of match are satisfied, it is determined that the second and third conditions are satisfied. When the degree Mi of match with the face identification data of another user is high, the face image will be similar also to the face of another user at a certain level, while being similar to the face of the identified user. Registering such an image easily causes confusion with this another user in authentication. Therefore, such an image is excluded from the registration subject by setting the upper limit to Mi. Preferably, the thresholds about the degree S of match with the face identification data of the user oneself are set independently of each other regarding the first, second, and third conditions. The thresholds about the degree Mi of match with the face identification data of another user are also set independently of each other regarding the second and third conditions.

For example, when a user desires additional registration for oneself, face identification data as the comparison target is decided based on an online ID input by the user and therefore the possibility that the correspondence between a shot face image and the face identification data is accurate is higher than at other timings. Furthermore, it is preferable that the probability of registration is high also because the user oneself requests the registration. Therefore, the thresholds are so set as to provide the widest range as the range of the degree S of match in which the present timing is determined as the timing when the registration should be carried out.

The registration at the time of the first-stage face authentication and the registration at the time of the second-stage face authentication are both automatically carried out by the device. However, the accuracy of the correspondence between a face image and a user in the second-stage face authentication is higher than that in the first stage because the user oneself expresses that the correspondence between the face image and the online ID is correct by putting the face in a face frame. Therefore, the ranges of the degrees S and Mi of match in which the present timing is determined as the timing when registration should be carried out are set wider than those of the first stage. By such a configuration, opportunities to register face identification data can be increased as much as possible with a small burden on the user and authentication can be carried out based on the latest information consistently. As a result, it is possible to realize authentication processing robust against long-term changes such as change in a face due to growth and aging in addition to condition changes in a comparatively short period, such as change in the above-described illumination environment.

By changing the condition for deciding whether or not to carry out registration according to the intention of the user, the accuracy of input information, and so forth, the frequency of erroneous registration and useless registration can be suppressed. If data of face images or data of part thereof is stored as face identification data, part of the already-stored face identification data of the corresponding user may be deleted concurrently with new registration of face identification data. For example, the following data are preferentially deleted: the oldest data; data that had a lower degree of match than other data in the history of past authentication processing although being data of the same user; and data older than other data in the timing when the data was used for success in authentication (it was determined that the degree of match with a shot image was higher than a threshold or the degree of match was the highest when the authentication succeeded).

In the latter case, every time the corresponding user logs in, the degrees of match calculated about the respective face identification data in the authentication of the login are stored and the face identification data are deleted in increasing order of the average of the history of the degree of match. This can save the capacity of the registered user information holder 130. In addition, if plural face identification data of the same user are each compared with a shot image in e.g. authentication through block matching, the comparison target can be decreased to reduce the burden of the authentication processing and the time it takes to execute the processing.

As above, in the case of individually storing face identification data every time registration is carried out and comparing each of the stored data with a shot image, an upper limit may be set on the number of face identification data stored in the registered user information holder 130 and, if data has been registered to this upper limit, any of the already-stored data may be overwritten when new data is registered. In this case, the following scheme may be further employed.

Specifically, face identification data are stored in the registered user information holder 130 in such a manner that face identification data registered based on the intention of the user as shown in FIG. 10 are classified into a first group and face identification data automatically registered by the device as shown in FIG. 11 are classified into a second group. Furthermore, for each of these groups, an upper limit is set on the number of data that can be stored. In registration of data exceeding the upper limit, already-stored data of the first group is overwritten if the new data is data of the first group and already-stored data of the second group is overwritten if the new data is data of the second group.

This can prevent the occurrence of an inconvenience that the face identification data registered based on the intention of the user are all overwritten with face identification data automatically registered by the device and the authentication accuracy is lowered. Moreover, it is also possible to employ a configuration in which a counter to count the number of times of use for success in authentication for each of already-registered face identification data is provided and the data with the smallest number of times of use is overwritten when new data is registered. However, for just-registered data, the number of times of use for success in authentication is small naturally. Therefore, a viewpoint relating to time may be taken into consideration. Specifically, for example the number of times of use may be weighted depending on the elapsed time from registration. Furthermore, the face identification data selected as a candidate for overwriting may be further compared with the data that should be newly registered and the new registration may be cancelled if the degree of match is higher than a predetermined threshold. This can prevent the occurrence of an inconvenience that the number of times of use for success in authentication returns to 0 although the newly registered data is similar to the overwritten data and this newly registered data is easily selected as the overwriting target.

In any case, qualitatively it is preferable that face identification data used for success in authentication many times is prevented from being overwritten and a wide variety of data obtained under different illumination conditions and so forth are left as much as possible. It will be understood by those skilled in the art that various modifications are possible besides the above-described ones as methods for this purpose.

In the above, the login method based on face authentications of two stages without use of an input device is described. Next, a consideration will be made about a case in which an input device is used in processing after login, specifically a case in which the motion of a user is detected by shooting a marker provided on the input device and a game is made to progress or information processing is executed according to this. In the case of detecting the motion of plural users in such a mode, the motion of each user can be identified based on the color of the marker if the colors of the markers of the input devices held by the respective users are made different from each other. Therefore, the color of the marker of the input device is associated with the user who holds this input device at the time of login.

Figure 12:
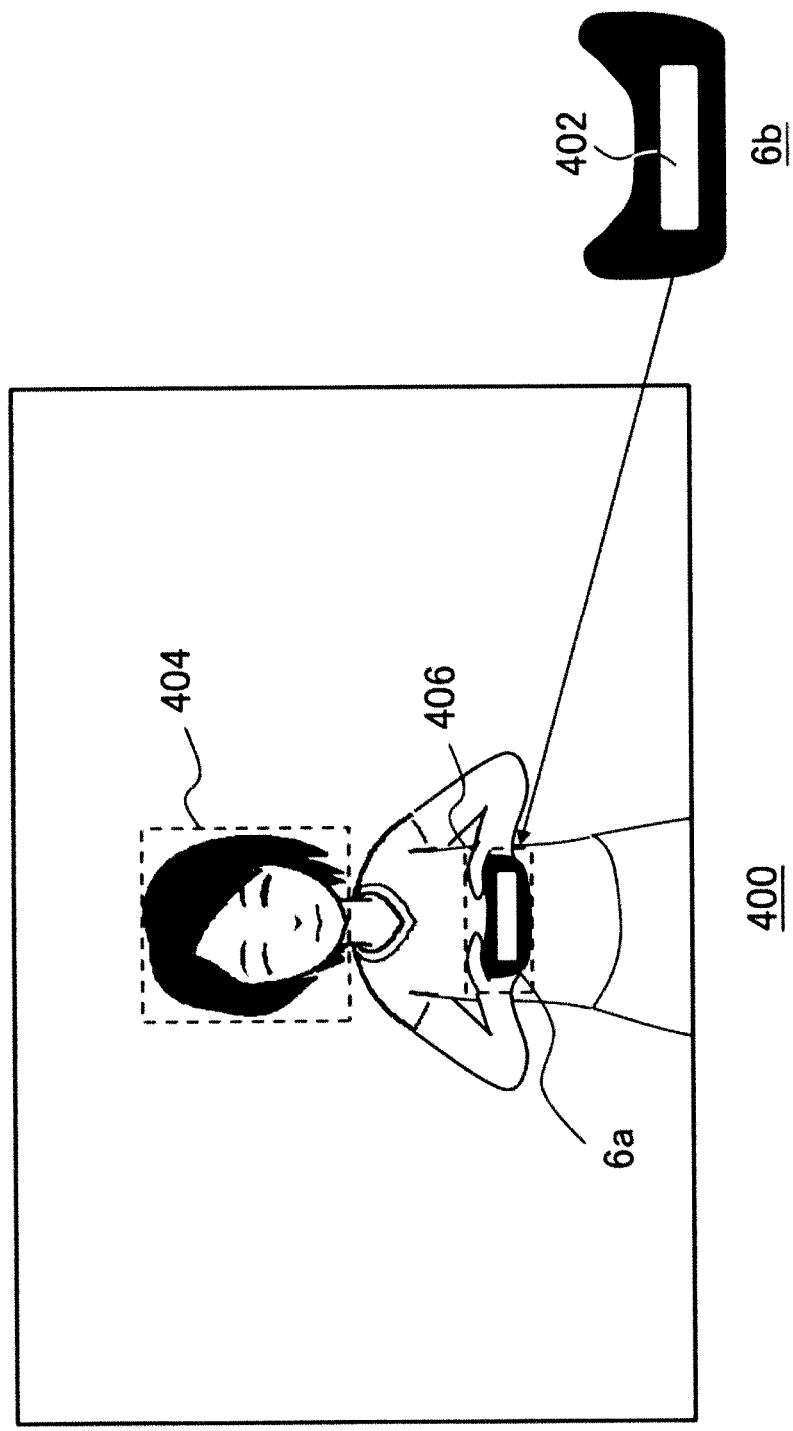
FIG. 12 is a diagram showing one example of an image shot by the camera when login processing is executed with combining of face authentication and marker detection in the embodiment.

FIG. 12 shows one example of an image shot by the camera 7 when login processing is executed with combining of face authentication and marker detection. One user is captured in a shot image 400 and this user holds the input device 6a. The input device 6a has a marker 402 as shown in an enlarged view (input device 6b) on the right side of FIG. 12. The marker 402 is formed of a light emitting diode that emits light with a predetermined color for example. However, the marker 402 does not need to emit light and the form thereof is not limited as long as it is an object that has known color, shape, and size and can serve as a detection target. It is also possible to stick a figure drawn on a plane, such as a two-dimensional bar code, to the input device 6a or draw a figure directly on the input device 6a.

The marker 402 is oriented toward the camera 7 when the user grasps left and right grip parts of the input device 6a with both hands and faces the camera 7 as shown in the diagram. The input device 6a may have operation units such as various kinds of operation buttons and joysticks besides the marker 402 although not shown in the diagram. The shape of the input device is not limited to that shown in the diagram. In this example, first, by the above-described first-stage face authentication, a registered user is identified based on feature data of a face image by using a face region 404 in the shot image 400. Furthermore, a region 406 of the image of the marker 402 is detected. Its color is then associated with the identified registered user to be utilized for later-stage information processing.

A rule that the user holds the input device 6a at a predetermined position such as a position in front of the chest at the time of login is set in advance so that the correspondence between the face and the marker may be understood based on the relative positions of the face region 404 in the shot image 400 and the region 406 of the image of the marker corresponding to it. For example, the online ID of the registered user identified by face authentication is displayed near the face region 404 and the user who has confirmed that it is the own online ID holds the input device 6a in front of the own chest. Due to this, the information processing device 10 detects the marker in the region 406 of the image of the marker and associates its color with the registered user. The position at which the input device 6a is held is not limited to one in front of the chest and may be under the jaw, above the head, or beside a ear for example as long as the position is set in advance and is recognized by the user.

Figure 13:
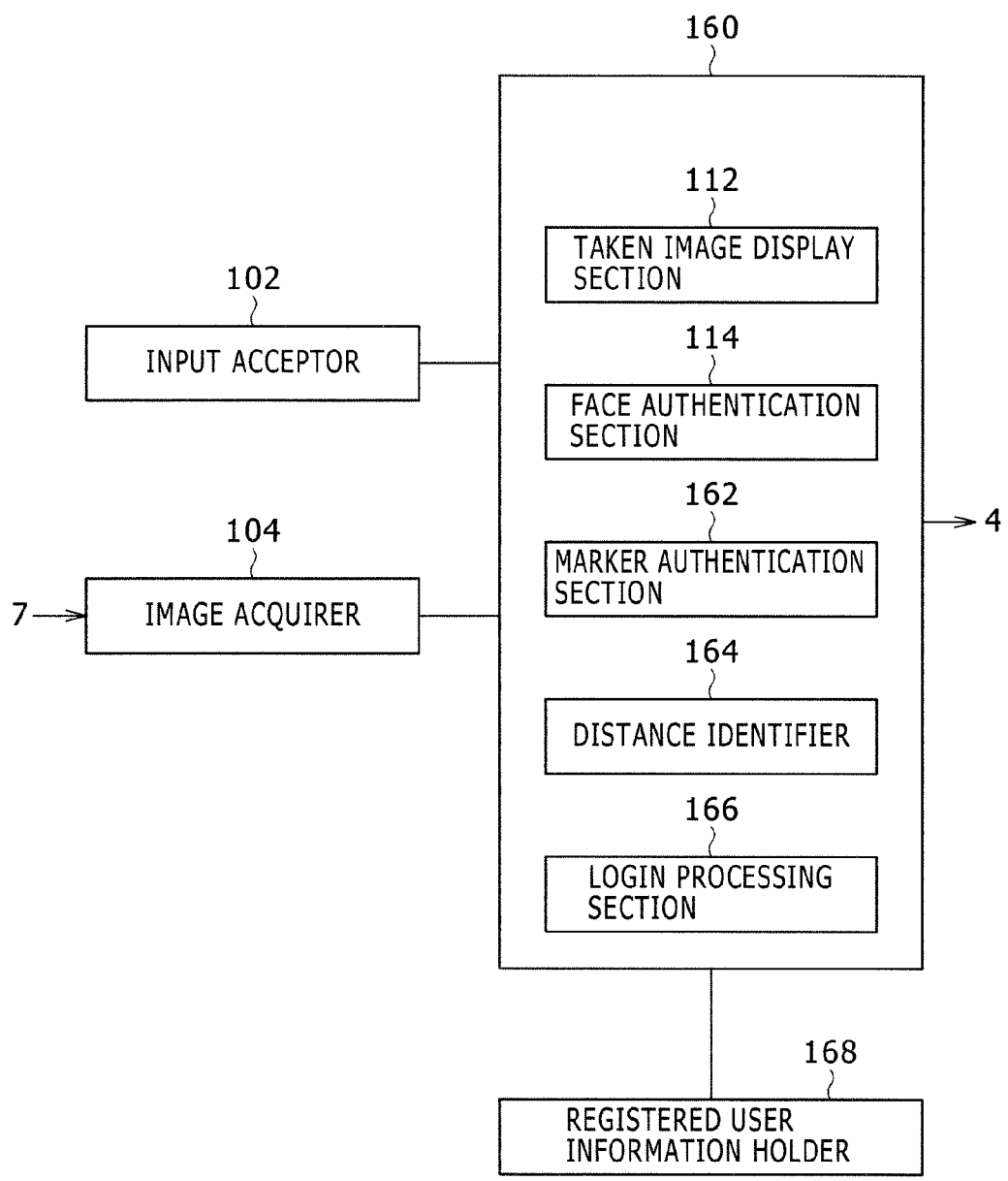
FIG. 13 is a diagram showing the functional block configuration of the information processing device when the login processing is executed by the face authentication and the marker detection in the embodiment.

FIG. 13 shows the functional block configuration of the information processing device 10 when login processing is executed by face authentication and marker detection. The same functional blocks as those shown in FIG. 3 are given the same numerals and description thereof is omitted. It is also possible to employ a configuration in which all functional blocks included in the login controller 110 shown in FIG. 3 are included in a login controller 160 shown in FIG. 13 and a user can select which login mode is used via the input device 6.

The information processing device 10 includes the input acceptor 102, the image acquirer 104, the login controller 160, and a registered user information holder 168. The information processing device 10 may further include the face identification data registration section 150 shown in FIG. 3. The login controller 160 has the taken image display section 112, the face authentication section 114, a marker authentication section 162, a distance identifier 164, and a login processing section 166.

The input acceptor 102, the image acquirer 104, and the taken image display section 112 and the face authentication section 114 in the login controller 160 have the same functions as those of the respective functional blocks shown in FIG. 3. However, the face authentication section 114 carries out only the first-stage authentication, which is composed of detection of a face region included in a shot image and identification of a registered user, and provides the marker authentication section 162 with information on the face region and the identified registered user. The registered user information holder 168 holds identification information such as the online ID of the user and face identification data in association with a user account.

The marker authentication section 162 of the login controller 160 detects, from the shot image, the image of a marker corresponding to the face region detected by the face authentication section 114. Specifically, the marker authentication section 162 detects the image of the marker that should exist at a relative position set in advance based on the position coordinates of the face region provided from the face authentication section 114. At this time, like the above-described face frame, a marker frame may be displayed at the position at which the marker should be held in the displayed image on the output device 4. Furthermore, the online ID of the identified user may be displayed near the marker frame.

In the shot image, the marker authentication section 162 makes a marker search in a region that has a predetermined size and is in a preset positional relationship with the face region provided from the face authentication section 114, such as a region on the chest. The marker authentication section 162 then notifies the login processing section 166 of color information of the detected marker in association with the information on the registered user notified from the face authentication section 114. When receiving this notification, the login processing section 166 allows this user to log in to the information processing device 10 and notifies information relating to the correspondence between the registered user and the marker color to an execution main entity (not shown) of information processing of a game or the like. Executing the same login processing for plural users allows the execution main entity of the information processing to discriminate the motion of each user based on the color of the marker.

If a monocular camera is used as the camera 7 and a pair of face and marker is detected from one shot image, the login processing is completed by the above-described configuration. On the other hand, a consideration will be made about separately shooting an image used for face recognition and an image used for marker detection in order to keep high accuracy in both the face recognition and the marker detection. A marker having specific size, color, shape, luminance, and so forth is easy to detect from room, person, object, etc. captured as an image and it is also easy to identify plural markers when the colors thereof are made different from each other. However, differently from in seeing by the human, how the marker is captured in an image greatly changes depending on the shooting environment such as the ambient brightness, whether an object is present or absent, and the ambient color and the shooting condition such as the exposure time, the aperture value, and the depth of focus.

In the case of shooting a wide-angle image including a user and a room, generally the shooting condition such as the white balance and the exposure time are automatically adjusted in matching with the shooting environment, which allows acquisition of an image that is well-balanced as a whole. However, in the case of detecting a marker in the image, changing the shooting condition according to the environment in this manner leads to change in how the marker is captured, i.e. the color, size, shape, luminance, and so forth of the image, which possibly causes a trouble in the detection processing.

For example, in the case of using a marker that emits light, if the exposure time decided according to the brightness of the room is too long, possibly the RGB values of the light emitting part of the marker are saturated and an image that is white irrespective of the color of the light emitter and has a blurry contour is obtained. Furthermore, if the marker moves at a comparatively high speed, possibly its image blurs.

Therefore, possibly the position of the marker cannot be accurately acquired and the color cannot be discriminated. Therefore, a stereo camera is used as the camera 7. An image obtained under a standard shooting condition is shot by one camera and an image obtained under a predetermined shooting condition suitable for detection of the marker is shot by the other camera. The former is used by the face authentication section 114 for face authentication and is used for displaying on the output device 4 by the taken image display section 112. The latter is used by the marker authentication section 162 for marker detection.

Figure 14:
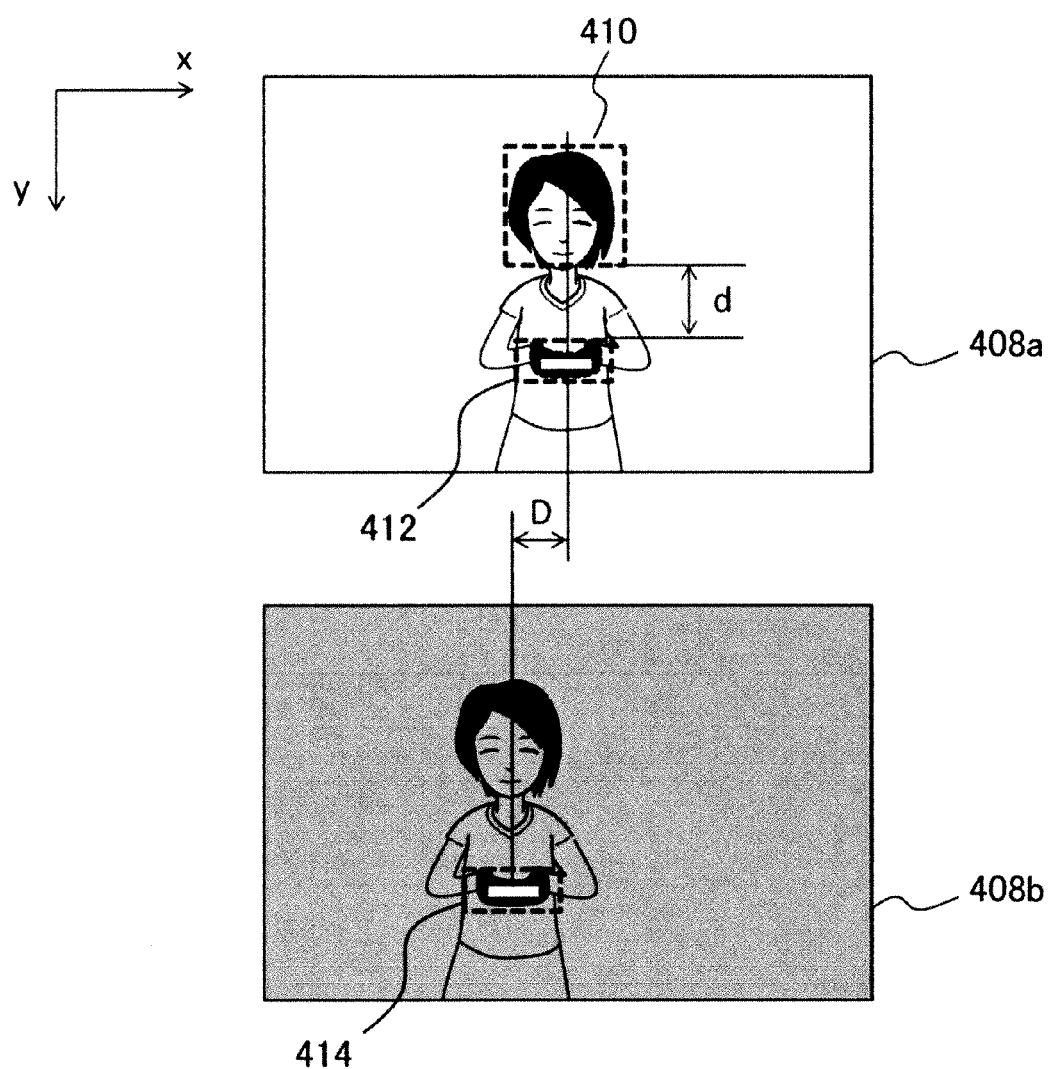
FIG. 14 is a diagram showing an example of stereo images shot when a stereo camera is used as the camera in the embodiment.

In such a mode, the distance identifier 164 corrects the disparity in the two images shot by the stereo camera so that the marker corresponding to a face can be accurately identified. FIG. 14 shows an example of images shot when a stereo camera is used as the camera 7. In this case, the shot images are stereo images obtained by shooting the same space by the stereo camera from left and right positions separate from each other by a predetermined distance. Of them, a first image 408a is shot under the standard condition and a second image 408b is shot under the condition suitable for marker detection.

That is, the first image 408a is a general image for which the shooting condition is automatically adjusted according to the environment in the shooting. The second image 408b is an image shot with focus on the marker and with shorter exposure time and a shallower depth of focus (smaller aperture value) compared with the first image 408a for example. By performing shooting under such a condition, the second image 408b is obtained as an image in which the light emitter part of the marker is close to the actual one in color, shape, size, and luminance although the brightness is totally low and other objects blur. Only either one of the exposure time and the aperture value may be changed as the shooting condition for marker detection or another parameter may be changed.

Although these images are obtained by simultaneously shooting the same subject, a disparity D is generated because the point of sight is different. First, the face authentication section 114 specifies a face region 410 by using the first image 408a. In the first image 408a, a marker search region 412 is located just under the face. Specifically, it is a region that has the same center axis as that of the face region 410 in the horizontal direction (x-axis direction) and is separate from the face region 410 by a predetermined distance d in the vertical direction (y-axis direction). In the example of FIG. 14, the distance d is the distance from the jaw to the chest.

However, when the marker authentication section 162 carries out marker detection by using the second image 408b, a marker search region 414 in this image is offset in the horizontal direction (x-axis direction) by the disparity D from the search region in the first image 408a. The disparity D changes depending on the distance of the subject from the camera. Therefore, the distance identifier 164 identifies this distance and provides it to the marker authentication section 162. Based on this, the marker authentication section 162 first decides the marker search region 412 in the first image 408a based on the position coordinates of the face region 410 supplied from the face authentication section 114 and then shifts it in the x-axis direction by the disparity D to thereby decide the marker search region 414 in the second image 408b. The shift direction differs depending on which of the left and right cameras is used to shoot the second image 408b naturally.

Figure 15:
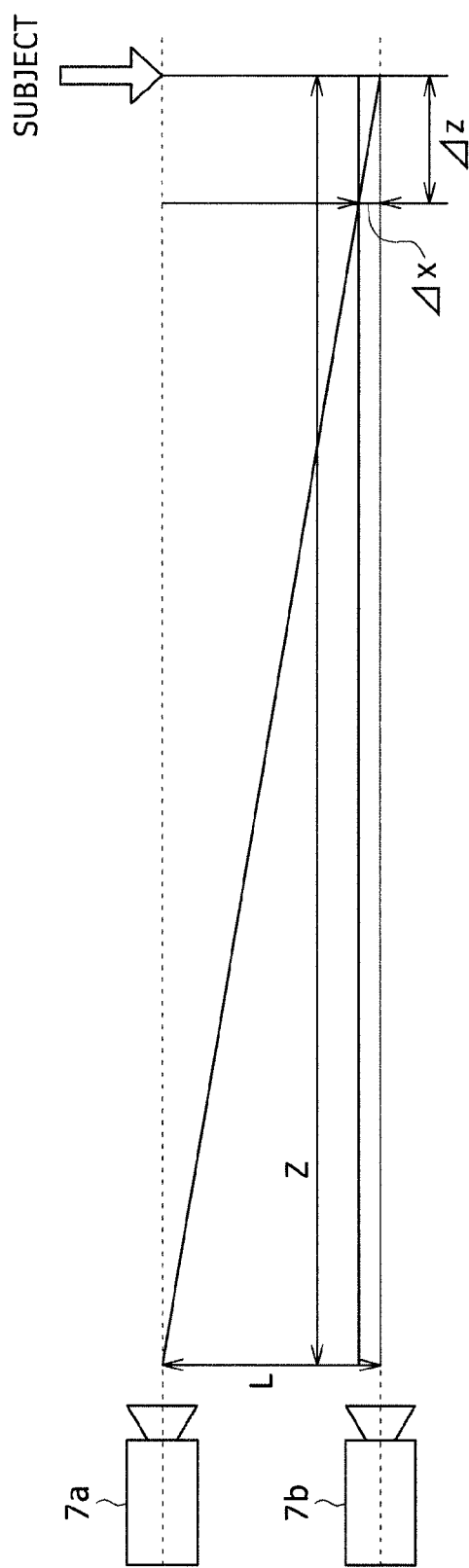
FIG. 15 is a diagram used to explain the relationship between disparity in stereo images and the position of a subject in the depth direction.

FIG. 15 is a diagram adapted to explain the relationship between the disparity in stereo images and the position of a subject in the depth' direction. Suppose that here the units of length are unified to the meter or the like unless stated. A first camera 7a and a second camera 7b of the camera 7 are so set as to have parallel optical axes positioned across distance L.

Suppose that the subject exists at a position of the right-end arrow separate from these stereo cameras by distance Z in the depth direction.

A width Δx in the actual space represented by one pixel of images shot by the respective cameras is proportional to the distance Z and expressed as follows.

$$\Delta x = Z \times w/W \quad (1)$$

In this expression, symbol W denotes the number of pixels of the cameras in the horizontal direction. Symbol w denotes the range of the field of view of the actual space in the horizontal direction when the distance Z is 1. It is determined by the angle of sight.

The same subject shot by the cameras separate by the distance L has, on the images thereof, the disparity D (pixels) in terms of the number of pixels, expressed below substantially.

$$D = L/\Delta x = L \times (W/w) \times (1/Z) = C/Z \quad (2)$$

In this expression, symbol C is a value determined by the cameras and setting thereof and can be regarded as a constant in operation. The marker authentication section 162 acquires the distance Z from the distance identifier 164 and obtains the disparity D on the images based on the above-described expression (2) to decide a marker search region in the second image 408b. It will be understood by those skilled in the art that the above expression is one example and various calculation expressions can be employed based on the principle of triangulation.

The disparity D of the marker search region is obtained from the distance Z of the marker from the camera basically. Various methods are possible as the method by which the distance identifier 164 identifies the distance Z. For example, a method is possible in which the first image 408a and the second image 408b are further utilized to generate a depth image by the stereo image method. The stereo image method is a general method in which feature points in stereo images are associated and the position of a subject in the depth direction is calculated from the disparity of them. The depth image is an image in which the distance of the subject from the camera in the depth direction is mapped on two-dimensional coordinates on the shot image plane and represented as a pixel value.

However, given that the marker is held by a person, there is a limit to the size of the marker. Therefore, generally the region of the image of the marker in a shot image is small. It is not easy to acquire the distance from the camera with high accuracy based on such a small region. Therefore, by utilizing the fact that the marker and the facial surface of a user who holds it are substantially equal in the distance from the camera, the disparity of the marker is derived with high accuracy.

For example, if holding the input device 6a in front of the chest as shown in FIG. 12 is prescribed as a pose at the time of login, the marker 402 is equivalent to the facial surface of the user in the distance from the camera. Therefore, the disparity is obtained based on the distance of the facial surface, which has a larger area than the region of the image of the marker and thus is expected to allow high derivation accuracy. Specifically, the distance identifier 164 reads out the pixel values of the face region detected by the face authentication section 114 in a generated depth image. These pixel values represent the distance of the facial surface from the camera and thus the distance Z is obtained through e.g. calculation of the average of the whole region.

The above-described example has high effectiveness in that the distance can be obtained with high accuracy without the need for new input data because the stereo images originally shot are used. On the other hand, the distance identifier 164 may calculate the distance Z based on the size of the face region without generating a depth image. Alternatively, the disparity of the face region in the stereo images may be substituted for the disparity of the marker. In e.g. a case in which the accuracy of stereo matching and hence the accuracy of the depth image appear to be insufficient due to e.g. difference in the shooting condition between the first image 408a and the second image 408b, face recognition processing may be executed for both the first image 408a and the second image 408b and thereby the face region of the same user may be identified in both images to obtain the disparity.

The distance from the face to the chest, i.e. the distance d from the face region to the marker search region, may also be adjusted according to the distance from the camera to the face. Besides, the distance identifier 164 may use various existing techniques such as a technique of deriving the distance of the marker based on a time-of-flight (TOF) system by an infrared irradiation/detection system additionally provided.

Alternatively, it is also possible to employ a method in which the distance Z is deemed as a fixed value and the user is made to recognize the distance from the camera in advance and exist at the corresponding position. If the relative positions of the facial surface and the marker in the depth direction are already, known, both do not necessarily need to exist at the same position because the distance of the marker can be calculated from the distance of the facial surface. For example, if stretching the arms forward to dispose the marker on the foremost side is employed as a pose at the time of login, the marker is located closer to the camera than the facial surface by the length of the arms and therefore the disparity D of the marker can be derived from the distance of the facial surface. Depending on the case, the image itself of the marker may be detected from the first image 408a and the second image 408b and the disparity D of the marker may be directly identified.

In any case, by shooting an image under a condition separately set for marker detection and carrying out the marker detection in consideration of the disparity with the image used for face recognition, the accuracy of the marker detection can be kept irrespective of the illumination environment and so forth at the time. Furthermore, for example when plural users are close to each other, the possibility that the marker of another person is detected as confusion and login is disrupted can be suppressed. Moreover, the marker search region can be accurately obtained. Therefore, a uselessly-large region does not need to be searched, which can reduce the burden of marker detection processing.

Strictly, possibly the first camera 7a and the second camera 7b include a slight amount of offset in the vertical direction, slight rotation of the imaging plane, and so forth as factors other than the distance L in the horizontal direction depending on e.g. how lenses are attached. In this case, the offset of images between the first image 408a and the second image 408b shot by both cameras includes components other than the disparity D in the horizontal direction. Therefore, the marker authentication section 162 may decide the marker search region 414 in the second image 408b in consideration of also these components in practice. Because individual differences also exist in the positional offset and rotational offset of the lenses, measurement is performed at the time of manufacturing or the like and the measured values, parameters adapted to correct the offsets, and so forth are set inside the information processing device 10.

Figure 16:
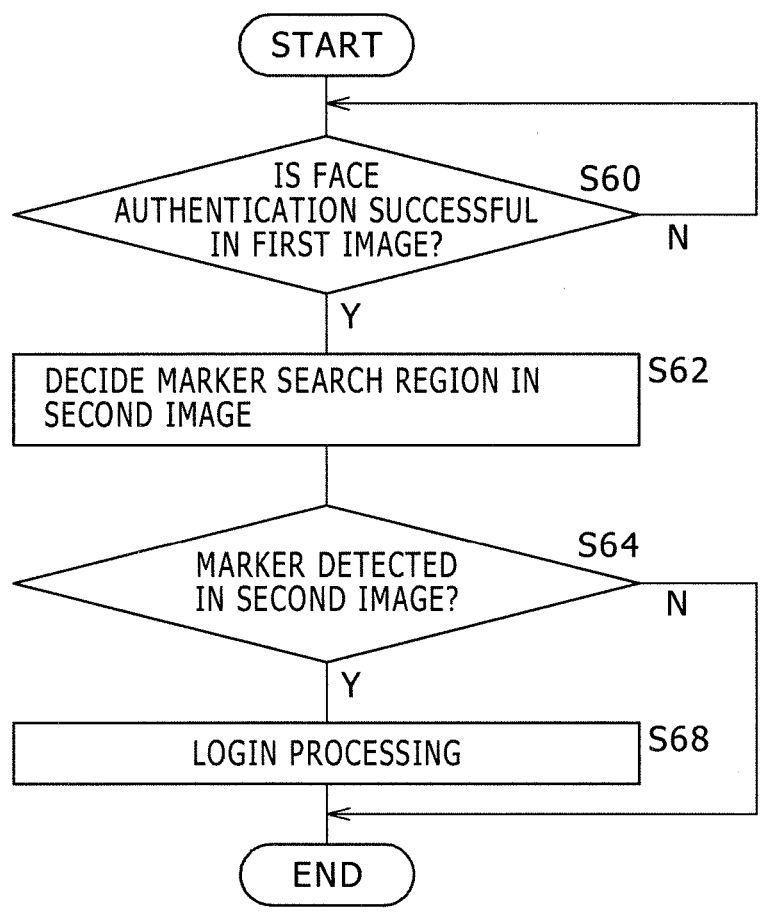
FIG. 16 is a flowchart showing procedure in which the information processing device in the embodiment executes the login processing by carrying out the face authentication and the marker detection with use of stereo images.

FIG. 16 is a flowchart showing the procedure in which the information processing device 10 executes login processing by carrying out face authentication and marker detection with use of stereo images. First, the face authentication section 114 reads out stereo images acquired by the image acquirer 104 from the memory. Then, the face authentication section 114 extracts a part estimated to be a person's face in the first image shot under the standard condition, of these stereo images, and compares it with face identification data held in the registered user information holder 168 to thereby determine that the extracted face is the face of a registered user (S60). During the period in which a face is not detected or the detected face is not the face of a registered user, i.e. the face authentication is unsuccessful, the face detection and the determination processing are repeated at a predetermined time interval (N of S60). If it is determined that the detected face is the face of a registered user and the face authentication succeeds (Y of S60), the face authentication section 114 provides the marker authentication section 162 with the position coordinates of the face region in the first image and the identification information of the user.

Based on the position coordinates of the face region in the first image, the marker authentication section 162 decides a marker search region in the second image for this user, i.e. in an image shot under the condition for marker detection (S62). At this time, the distance identifier 164 reads out data of the stereo images acquired by the image acquirer 104 and acquires the distance of the facial surface or a marker from the camera by stereo matching processing or the like to notify the marker authentication section 162 of the distance. This allows the marker authentication section 162 to decide the search region in consideration of the disparity of the marker in these stereo images. Then, the marker authentication section 162 carries out marker detection about this search region (S64). If a marker is not detected for a predetermined time, the processing is ended with doing nothing (N of S64).

If a marker is detected (Y of S64), the marker authentication section 162 notifies the login processing section 166 of its color in association with the information on the registered user notified from the face authentication section 114. In response to this notification, the login processing section 166 allows this user to log in (S68). At this time, the login processing section 166 notifies an execution main entity of a game or the like of information relating to the correspondence between the color and the registered user as described above.

Next, a consideration will be made about further enhancement in the accuracy of the marker detection by the marker authentication section 162 in S62. In the present embodiment, based on the color of a marker, the user who is operating the input device 6 having it is discriminated. Therefore, even when plural users who each hold the input device 6 having a marker of a respective one of different colors are simultaneously captured in a shot image, the correspondences between the respective colors and the positions of the users should be accurately derived irrespective of the positions.

However, particularly when the marker is a light emitter, possibly variation is caused in the color represented as the pixel value of the image of the marker due to the color component included in light, the detection accuracy of an imaging element such as a complementary metal oxide semiconductor (CMOS) sensor that detects it, the output accuracy of a correction circuit, and so forth. For example, when markers of four colors, blue, red, green, and pink, are used, a situation possibly occurs in which the component of pink strongly appears in the periphery of the red marker. In this case, it is difficult to accurately determine whether this marker is the red marker or the pink marker and whether the pink marker actually exists near the red marker. This occurs not only at the time of login and is the same also in operation to a game or the like after login. The determination error possibly causes erroneous operation.

Figure 17:
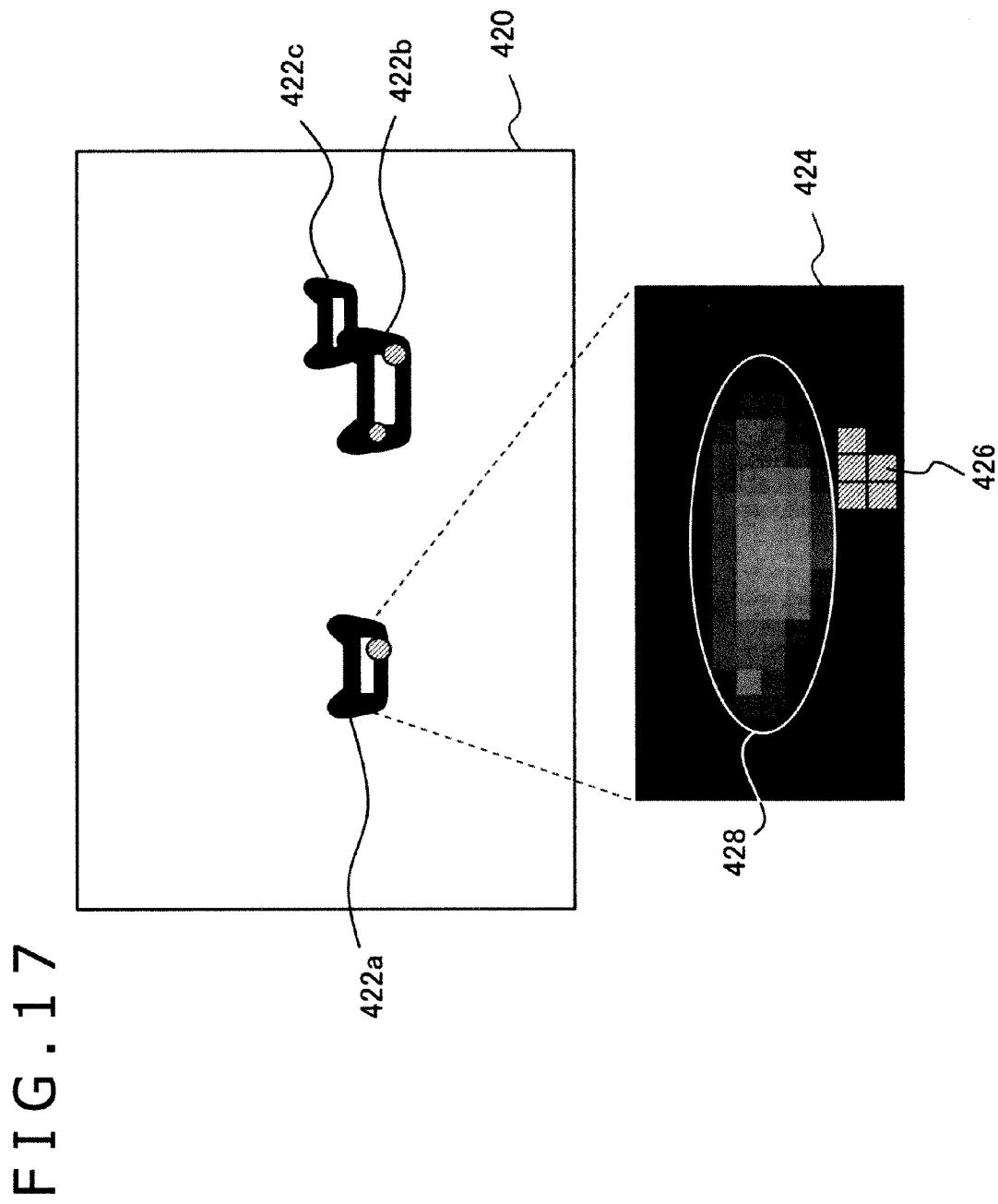
FIG. 17 is a diagram showing an example of a shot image in which markers are captured in the embodiment.

FIG. 17 schematically shows a shot image including the images of markers. However, the images of users who hold them are omitted in this diagram. In a shot image 420, three input devices 422a, 422b, and 422c having the markers with colors different from each other are captured. Hatched circles near the markers of the input devices 422a and 422b schematically show regions where a color component different from the original color of the marker strongly appears. For example, as shown in an enlarged image 424 of the marker part of the input device 422a, a pixel aggregate 426 representing a different color often appears near a pixel aggregate 428 representing the color of the marker due to the above-described reasons.

In such a case, in the region detected as a marker from the shot image, the part of the pixel aggregate 426 is not the image of the marker even when having the marker color and therefore should be excluded from the detection result. In the simplest idea, when plural colors closely exist in this manner, the color of the largest area would be regarded as the original color of the marker. However, the region occupied by the image of the marker in the shot image is small as described above and possibly the area itself that should be compared as above includes an error. Furthermore, as in the input devices 422b and 422c, markers whose apparent size is different depending on the distance from the camera appear to overlap with each other in some cases. Therefore, even an actual marker could be excluded.

Therefore, as a criterion of the exclusion, the size of the casing itself of the input device is added to the region area of each color. The color region to be excluded from the object detected as the marker is thereby identified with high accuracy. FIG. 18 is a flowchart showing the procedure of processing of identifying the color that can be deemed as the marker in marker detection processing. This processing is executed by the marker authentication section 162 at the time of login. Besides, it can be executed also in operation of a game or the like. Therefore, the marker search region is diverse depending on the situation of the processing. At the time of login, the marker search region may be a region in a predetermined positional relationship with a face region as described above. When moving the marker freely is permitted in a game or the like, refinement of the search region may be additionally performed by tracking processing or the like. Depending on the case, the whole of the shot image may be deemed as the search region.

First, the marker authentication section 162 reads out a shot image acquired by the image acquirer 104 from the memory and extracts a region that is possibly a region of the color of a marker through e.g. scanning of a search region in the shot image (S70). At this timing, plural regions of the same color are extracted in some cases. Next, regions formed of continuation of the same color or a color that can be deemed as the same color are sorted in decreasing order of area (S72). At this time, each region is given an identification number i in increasing order, i.e. 1, 2, 3, . . . . Next, the region of i=1, which is the largest, is deemed as the n-th (=1st) target region (S74) and the range covered by the image of the casing of the input device when it is assumed that this region is the image of a marker is identified (S76). This range is, that is, a region inside the contour of the image of the casing, specifically e.g. the black part of the input device 422a in FIG. 17, and is decided based on the shape and size of the casing and the distance of the input device from the camera.

The shape and size of the casing are already known naturally. The distance of the input device from the camera may be derived from the size of the region i, or the distance identifier 164 may identify the distance by shooting stereo images and creating a depth image. In the latter case, in view of the possibility that the distance of the input device itself includes many errors, the distance may be estimated from the distance of the body of the person who is holding it, such as the face or hand, as described above. Without generating a depth image, the distance may be calculated based on the disparity of a marker or a person's image in a pair of stereo images shot by the left and right cameras. If at least part of a region of a color different from the color of the target region is included in the range of the image of the relevant casing, this region is excluded from the extraction result (S78).

When the number of all colors of the markers is defined as N, if the target region is not the N-th region (N of S80), the range covered by the image of the casing is identified about the (n+1)-th target region, which has the next largest area. Then, if a region of a color different from the color of the target region exists in this range of the image, this region is excluded from the extraction result (S82, S76, S78). The processing of S82, S76, and S78 is repeated N times (N of S80) and the processing is ended if the exclusion processing for the N-th target region ends (Y of S80). If the number of regions extracted in S70 is equal to or smaller than N, the processing is ended after all regions are employed as the target region. Due to this, only the regions that are highly likely to be markers are left as the detection result.

Giving priority to the region with the larger area in this manner is based on that this region is highly likely to be a marker and knowledge that, if this region is assumed to be a marker and the range covered by the image of the casing is assumed, a marker with a smaller image than the marker is not located on the camera side relative to this casing. This can prevent inconveniences that a different color component accidentally detected in the periphery of a marker as shown in FIG. 17 is erroneously recognized as a marker and that any of plural markers close to each other is erroneously excluded from the marker detection subject.

Instead of selecting the target region one by one sequentially from the larger area as shown in FIG. 18, the following method may be employed. Specifically, about all extracted regions, scoring is performed based on criteria such as the area of the region and whether or not the region is within the range covered by the image of the casing of a marker if a region of a different color within a short distance is the marker. Furthermore, for each region, the possibility that the region is a marker is represented by a respective one of the scores. The final detection subject is thereby identified.

The present disclosure is described above based on the embodiment. It will be understood by those skilled in the art that this embodiment is exemplification and various modification examples are possible in combinations of the respective constituent elements and the respective processing processes thereof and such modification examples are also within the scope of the present disclosure.

The present disclosure contains subject matter related to that disclosed in Japanese Priority Patent Application JP 2013-228136 filed in the Japan Patent Office on Nov. 1, 2013, the entire content of which is hereby incorporated by reference.

What is claimed is:

1. An information processing device comprising:
    an image acquirer configured to acquire a shot image of a user;
    a registered user information holder configured to hold face identification data of a registered user;
    a face recognition section configured to detect a face image of a registered user existing in the shot image by comparing the face image to face identification data held in the registered user information holder; and
    an information processing section configured to authenticate the registered user based on a detection result by the face recognition section,
    wherein the face identification data includes information on a face image of a user shot in advance and an after-processing image obtained by performing predetermined processing on the face image,
    wherein the after-processing image includes an image obtained by changing luminance of a predetermined region in the face image,
    wherein a size of the predetermined region is a smaller than a size of the face image, and
    wherein the after-processing image includes an image obtained by changing luminance based on a range in which a shadow is made when a predetermined incident angle of light is assumed.

2. The information processing device according to claim 1, wherein the after-processing image includes an image obtained by making orientation of a face different from orientation of the face in the face image.

3. The information processing device according to claim 1,
    wherein the image acquirer acquires a plurality of shot images obtained by shooting a user from a plurality of directions, and
    the face identification data includes information on shot face images of the user in a plurality of orientations.

4. The information processing device according to claim 3, wherein the after-processing image includes an image that is generated through interpolation from the face images of the user in the plurality of orientations and includes a face in an orientation different from orientation of the face in the face image.

5. The information processing device according to claim 1, wherein the after-processing image includes an image obtained by changing an expression of a face in the face image.

6. The information processing device according to claim 1, wherein the after-processing image includes an image obtained by combining the face image with another image representing a wearable object or hair.

7. The information processing device according to claim 1, wherein the after-processing image includes an image obtained by changing color of skin in the face image.

8. An information processing method comprising:
    acquiring a shot image of a user from a connected imaging device;
    reading out face identification data of a registered user stored in a storage device and detecting a face image of a registered user existing in the shot image by comparing the face image to face identification data; and
    authenticating the registered user based on a result of the detection,
    wherein the face identification data includes information on a face image of a user shot in advance and an after-processing image obtained by performing predetermined processing on the face image
    wherein the after-processing image includes an image obtained by changing luminance of a predetermined region in the face image,
    wherein a size of the predetermined region is a smaller than a size of the face image, and wherein the after-processing image includes an image obtained by changing luminance based on a range in which a shadow is made when a predetermined incident angle of light is assumed.

9. A non-transitory computer-readable recording medium in which a computer program is recorded, the computer program for a computer including:
acquiring a shot image of a user from a connected imaging device;
reading out face identification data of a registered user stored in a storage device and detecting a face image of a registered user existing in the shot image by using the face identification data; and
executing information processing based on a result of the detection,
wherein the face identification data includes information on a face image of a user shot in advance and an after-processing image obtained by performing predetermined processing on the face image,
wherein the after-processing image includes an image obtained by changing luminance of a predetermined region in the face image,
wherein a size of the predetermined region is a smaller than a size of the face image, and
wherein the after-processing image includes an image obtained by changing luminance based on a range in which a shadow is made when a predetermined incident angle of light is assumed.

* * * * *